US012803179B2

(12) United States Patent
Van De Ven et al.

(10) Patent No.: US 12,803,179 B2
(45) Date of Patent: Nov. 17, 2026

(54) DUAL POLARIZED ANTENNA ARRANGEMENT FOR WIDE SCANNING ARRAYS

(71) Applicant: Gapwaves AB, Gothenburg (SE)

(72) Inventors: Coen Van De Ven, Gothenburg (SE); Carlo Bencivenni, Gothenburg (SE)

(73) Assignee: Gapwaves AB, Gothenburg (SE)

( * ) Notice: Subject to any disclaimer, the term of this patent is extended or adjusted under 35 U.S.C. 154(b) by 248 days.

(21) Appl. No.: 18/572,833

(22) PCT Filed: Jun. 20, 2022

(86) PCT No.: PCT/EP2022/066706
§ 371 (c)(1),
(2) Date: Dec. 21, 2023

(87) PCT Pub. No.: WO2022/268702
PCT Pub. Date: Dec. 29, 2022

(65) Prior Publication Data

US 2024/0291162 A1 Aug. 29, 2024

(30) Foreign Application Priority Data

Jun. 21, 2021 (SE) .................................... 2130171-8

(51) Int. Cl.
*H01Q 21/00* (2006.01)
*H01P 3/123* (2006.01)
(Continued)

(52) U.S. Cl.
CPC ......... *H01Q 21/0043* (2013.01); *H01P 3/123* (2013.01); *H01Q 13/10* (2013.01); *H01Q 21/064* (2013.01)

(58) Field of Classification Search
CPC .. H01Q 13/10; H01Q 21/064; H01Q 21/0043; H01Q 13/18; H01Q 13/20; H01P 3/123
See application file for complete search history.

(56) References Cited

U.S. PATENT DOCUMENTS

| | | | | |
|---|---|---|---|---|
| 5,541,612 A * | 7/1996 | Josefsson | H01Q 25/001 333/237 |
| 6,127,985 A * | 10/2000 | Guler | H01Q 21/005 343/770 |
| 7,688,268 B1 * | 3/2010 | West | H01Q 15/14 343/770 |
| 2010/0085263 A1 * | 4/2010 | Yano | H01Q 13/22 343/771 |

(Continued)

FOREIGN PATENT DOCUMENTS

| | | | |
|---|---|---|---|
| CN | 104518289 A * | 4/2015 |
| CN | 212571362 U * | 2/2021 |
| WO | 2021016218 A1 | 1/2021 |

OTHER PUBLICATIONS

Bagheri et al, "A 45° Dual-Polarized Antenna for 5G mmWave Applications Based on Gap Waveguide Technology", 2019 International Symposium on Antennas and Propagation (ISAP), Antenna Branch of Chinese Institute of Electronics, Oct. 27, 2019 (Oct. 27, 2019), pp. 1-3, XP 033692450, 3 pages.

(Continued)

*Primary Examiner* — AB Salam Salam Alkassim, Jr.
(74) *Attorney, Agent, or Firm* — PANITCH SCHWARZE BELISARIO & NADEL LLP

(57) ABSTRACT

An antenna arrangement (100) having a layered configuration comprising a slot layer (130) comprising one or more slot layer apertures (131), and a distribution layer (120) facing the slot layer. The distribution layer is arranged to distribute two radio frequency, RF, signals to the one or more slot layer apertures (131). The distribution layer comprises a distribution layer feed (121) and at least one first waveguide (122) arranged to guide the RF signals between the distribution layer feed and the one or more slot layer apertures (131). The first waveguide (122) is a dual mode ridge waveguide comprising two parallel ridges (123) arranged on the distribution layer (120) and along the first waveguide, where the two ridges are arranged in proximity to each other to support two modes.

18 Claims, 20 Drawing Sheets

(51) Int. Cl.
*H01Q 13/10* (2006.01)
*H01Q 21/06* (2006.01)

(56) References Cited

U.S. PATENT DOCUMENTS

| | | | | |
|---|---|---|---|---|
| 2015/0188238 | A1* | 7/2015 | Oppenlaender | H01Q 21/064 343/756 |
| 2015/0222014 | A1* | 8/2015 | Stevenson | H01Q 13/18 342/372 |
| 2015/0222021 | A1* | 8/2015 | Stevenson | H01Q 21/005 343/771 |
| 2017/0271776 | A1* | 9/2017 | Biancotto | H01Q 21/064 |
| 2018/0301815 | A1* | 10/2018 | Kamo | G01S 13/931 |
| 2018/0351261 | A1* | 12/2018 | Kamo | H01Q 21/064 |
| 2019/0057945 | A1* | 2/2019 | Maaskant | H01P 3/121 |
| 2019/0074569 | A1* | 3/2019 | Kamo | H01P 5/222 |
| 2019/0260137 | A1* | 8/2019 | Watanabe | H01Q 13/22 |
| 2020/0194862 | A1* | 6/2020 | Kamo | H01P 5/024 |
| 2020/0212594 | A1* | 7/2020 | Kirino | H01Q 21/064 |
| 2021/0028528 | A1* | 1/2021 | Alexanian | H01Q 1/3233 |
| 2021/0175593 | A1* | 6/2021 | Tageman | H01P 1/208 |
| 2021/0296781 | A1* | 9/2021 | Lynch | H01Q 21/005 |
| 2022/0190477 | A1* | 6/2022 | Girard | H01P 5/107 |
| 2022/0200121 | A1* | 6/2022 | Shi | H01P 3/123 |
| 2022/0209423 | A1* | 6/2022 | Goebel | H01Q 13/18 |
| 2024/0186720 | A1* | 6/2024 | Bagherimoghim | H01Q 21/064 |
| 2025/0183544 | A1* | 6/2025 | Vosoogh | H01P 1/042 |
| 2025/0253547 | A1* | 8/2025 | Hajitabarmarznaki | H01Q 13/085 |
| 2025/0298077 | A1* | 9/2025 | Moreira | G01R 31/3025 |
| 2025/0300357 | A1* | 9/2025 | Moreira | H01Q 13/0258 |

OTHER PUBLICATIONS

Taghikhani et al, (2017). High gain V-band planar array antenna using half-height pin gap waveguide. 2017 11th European Conference on Antennas and Propagation, EUCAP 2017: 2758-2761. http://dx.doi.org/10.23919/EuCAP.2017.7928269.

Aboserwal et al, "An UltraCompact X-Band Dual-Polarized Slotted Waveguide Array Unit Cell for Large E Scanning Radar Systems". In: IEEE Access 8 (Jan. 2020), pp. 210651-210662.

Bagheri et al, "Microstrip to Ridge Gap Waveguide Transition for 28 GHz Steerable Slot Array Antennas", In: 2020 14th European Conference on Antennas and Propagation (EuCAP), 2020, pp. 1-4.

Mizuno et al, "Loss reduction of microstrip-to-waveguide transition suppressing leakage from gap between substrate and waveguide by choke structure", In: 2016 International Symposium on Antennas and Propagation (ISAP), 2016, pp. 374-375.

Balanis, "Antenna Theory: Analysis and Design", John Wiley & Sons, 4th Edition, Feb. 2016, 8 pgs.

Yong et al, "Wideband Cavity-Backed Slot Subarray Fed by Gap Ridge Waveguide for 5G mmWave Base Station", 2019 International Symposium on Antennas and Propagation (ISAP), Oct. 27-30, 2019, 5 pgs.

Milligan, "Modern Antenna Design", Wiley-IEEE Press, 2nd Edition, Jul. 2005, 10 pgs.

Ferrando-Rocher et al, "8×8 Ka-Band Dual-Polarized Array Antenna Based on Gap Waveguide Technology" in IEEE Transactions on Antennas and Propagation, 12 pgs, (Apr. 2019).

Sangster, "Compact Slot Array Antennas for Wireless Communications", Springer, Cham. 2019, 28 pgs.

Zaman et al, "GAP Waveguides" in Handbook of Antenna Technologies, Ed. by Z.N. Chen et al, Singapore: Springer Singapore, 2016, pp. 3273-3347.

Aljuhani et al, "A Scalable Dual-Polarized 256-Element Ku-Band Phased-Array SATCOM Receiver with +/− 70 deg. Beam Scanning" in 2018 IEEE/MTT-S International Microwave Symposium—IMS. 2018, pp. 1203-1206.

Huang et al, "Design of a Symmetric Rectangular Waveguide T-Junction with In-Phase and Unequal Power Split Characteristics" in 2013 IEEE Antennas and Propagation Society International Symposium (APSURSI), 2013, pp. 2119-21200.

* cited by examiner

DUAL POLARIZED ANTENNA ARRANGEMENT FOR WIDE SCANNING ARRAYS

CROSS-REFERENCE TO RELATED APPLICATIONS

This application is a § 371 national phase entry of International Application No. PCT/EP2022/066706, filed Jun. 20, 2022, which claims priority to Swedish Patent Application No. 2130171-8, filed Jun. 21, 2021.

TECHNICAL FIELD

The present disclosure relates to antenna arrangements, transition arrangements, and waveguide arrangements suitable for a dual polarized antenna element, e.g., a column of vertical and horizontally polarized apertures. The dual polarized antenna element is suited for use in array antennas used in, e.g., telecommunication and radar transceivers.

BACKGROUND

With the introduction of gap waveguide technology, a multitude of antennas have been designed and tested, see, e.g., P.-S. Kildal and A. U. Zaman, "GAP Waveguides", In: Handbook of Antenna Technologies, Ed. By Z. N. Chen, et. al., Singapore: Springer Singapore, 2016, pp. 3273-3347. Several of these types have been commercialized with various applications in mind. For the telecommunications market, a large focus is pointed towards wide scanning arrays where currently the slotted ridge gap waveguide (SRGW) can be regarded as the standard when using the gap waveguide technology. This type of antenna has proven its viability while radiating in one polarization.

Dual-polarized antenna are desirable in telecommunication application, radar applications, and other wireless applications. One of the benefits of having two orthogonal polarizations is the ability to perform polarization division multiplexing. Furthermore, controlling the transmission of two independent, orthogonal polarized, beams opens the possibility to create any polarization due to the superposition principle. This ability is especially useful in environments where the relative orientation between transmitter and receiver can change or is unknown.

There is need for improved antenna arrangements suitable for two polarizations.

SUMMARY

It is an object of the present disclosure to provide improved antenna arrangements suitable for two polarizations. This object is at least in part obtained an antenna arrangement having a layered configuration. The antenna arrangement comprises a slot layer comprising one or more slot layer apertures, and a distribution layer facing the slot layer. The distribution layer is arranged to distribute two radio frequency, RF, signals to the one or more slot layer apertures. The distribution layer comprises a distribution layer feed and at least one first waveguide arranged to guide the RF signals between the distribution layer feed and the one or more slot layer apertures. The first waveguide is a dual mode ridge waveguide comprising two parallel ridges arranged on the distribution layer and along the first waveguide, where the two ridges are arranged in proximity to each other to support two modes.

The dual mode ridge waveguide supports two modes that can be used for radiating two signals with different polarization. The two signals may originate from the same signal and be combined using superposition for an arbitrary polarization. The disclosed antenna arrangement is thus suitable for a dual polarized antenna element, e.g., a column of vertical and horizontally polarized apertures. The dual mode ridge waveguide also enables a compact feeding arrangement which in turn allows for a small spacing between the radiating apertures, both in a column and between columns in an array. The dual polarized antenna element can have a width less than half a free space wavelength, which allows it to be used in 1-D scanning arrays. Furthermore, the disclosed arrangements respect manufacturing constraints which indicate the feasibility for large-scale manufacturing.

According to aspects, the two ridges are separated from each other by less than half a free space wavelength, preferably less than a quarter of such wavelength, and more preferably less than a tenth of such wavelength. This can enable similar propagation properties for the two modes.

According to aspects, the distribution layer comprises a recess in between the two ridges, where a distance from the bottom of the recess to the top of the two rides is a quarter of a free space wavelength. This enables high isolation between the two modes.

According to aspects, at least one slot layer aperture is a dual mode aperture. This can be used to radiate two different polarizations from the same location.

According to aspects, the at least one dual mode slot layer aperture comprises three elongated arm sections. According to further aspects, the elongated arm sections are symmetrically arranged with respect to a center of the aperture. This enables an aperture that supports only two modes and not more in a frequency band of operation.

According to aspects, the antenna arrangement comprises a plurality of dual mode apertures. Each dual mode comprises three elongated arm sections symmetrically arranged with respect to a center of the aperture, and wherein at least two of the dual mode apertures are arranged mirrored with respect to each other along the first waveguide. This suppress unwanted grating lobes and can be used to increase the effective area of the combined apertures.

According to aspects, the antenna arrangement comprises at least two slot layer apertures separated from each other by a guide wavelength. This way, those two slots layer apertures are fed with the same phase from the first waveguide.

According to aspects, the antenna arrangement comprising at least two slot layer apertures separated from each other by half a guide wavelength. This way, grating lobes may be suppressed.

According to aspects, the antenna arrangement comprises at least two slot layer apertures being respective slots, where the two slots are arranged to couple to respective modes of the dual mode ridge waveguide. According to further aspects, one of the two respective slots is arranged extending along the first waveguide and the other slot is arranged extending orthogonal with respect to the first waveguide.

This way, two polarizations may be radiated into the air or be coupled into another layer.

According to aspects, at least one of the slots is a folded slot. This can save space and improve matching. It is especially beneficial if the slots extending perpendicular to the extension direction of the waveguide are folded since this reduces the width of the column.

According to aspects, the antenna arrangement comprises a second waveguide arranged extending in the same direction as the first waveguide. The distribution layer feed is arranged between the first and the second waveguides. The second waveguide is a dual mode ridge waveguide comprising two parallel ridges arranged on the distribution layer and along the second waveguide, where the two ridges are arranged in proximity to each other to support two modes. The second waveguide is arranged to guide the RF signals between the distribution layer feed and other one or more slot layer apertures arranged on the slot layer.

According to aspects, the distribution layer feed comprises a differential feed. According to further aspects, the two ridges are fed by respective ridge waveguides. This provides a good way to excite the two different modes of the first waveguide.

According to aspects, the distribution layer feed is a through hole extending through the distribution layer arranged to support two modes. This type of feed is easy to match to the first waveguide and enables access to the other side of the distribution layer, where a printed circuit board and/or circuits may be arranged. In addition, this makes it possible to feed multiple adjacent waveguides in an array from their respective centerers.

According to aspects, the distribution layer feed comprises a double ridge waveguide arranged to support a double ridge waveguide mode and a rectangular waveguide mode. This type is particularly easy to match.

According to aspects, one end of the first waveguide is connected to the distribution layer feed and the other end comprises a dual mode termination. This way, each mode can be terminated individually, which may improve propagation and matching performance of the two modes.

According to aspects, the dual mode termination comprises a first conductive wall arranged between the ridges and a second conductive wall arranged to short the first waveguide, where the second wall is arranged at a distance from the first conductive wall. This is an effective way of providing proper terminations for the respective modes.

According to aspects, the first conductive wall is arranged in proximity to a slot layer aperture and the second conductive wall is arranged at a quarter of a guide wavelength from another slot layer aperture. This provides a short circuit for one mode and an open circuit for the other mode, which provides a proper termination, which in turn enables strong coupling to the slot layer apertures.

According to aspects, one or more matching structures (M1, M2, M3) are arranged in proximity to an end of the first waveguide connected to the distribution layer feed. This improves the matching in the transition from the feed to the first waveguide.

According to aspects, a matching septum is arranged between the ridges and in proximity to a slot layer aperture. This improves the matching from the first waveguide to that slot layer aperture.

According to aspects, the dual mode ridge waveguide is a dual mode ridge gap waveguide. Replacing side walls of a waveguide with an EBG structure provides advantages in terms of, i.a., manufacturing tolerances, leakage, and losses.

According to aspects, the antenna arrangement further comprises an aperture layer, where the aperture layer comprises one or more aperture layer apertures, where the one or more slot layer apertures are arranged to couple to the one or more aperture layer apertures via a mode matching structure. This makes it possible to arrange the slot layer apertures such that they are fed with the correct phase from the first waveguide and arrange the aperture layer apertures such that the antenna arrangement radiates without or with minimal grating lobes.

According to aspects, the mode matching structure comprises at least one matching pin. According to further aspects, the mode matching structure comprises a pair of matching pins arranged along the direction of the first waveguide. According to additional aspects, the mode matching structure comprises a pair of matching pins arranged perpendicular to the direction of the first waveguide. The matching pin or pins provide an effective way of guiding the electrical field such that the modes of the slot layer apertures are matched to the modes of the aperture layer apertures. This way, the respective modes of the first waveguide can be radiated as separate polarizations.

According to aspects, at least one aperture layer aperture is a dual mode aperture. According to further aspects, the at least one dual mode aperture layer aperture comprises three elongated arm sections. According to additional aspects, the elongated arm sections are symmetrically arranged with respect to a center of the aperture. A dual mode aperture allows radiation of two different polarizations from the same aperture, which is an advantage. Furthermore, a tripole-like dual mode aperture supports only two modes, and not three, which is an advantage since a third mode typically degrades the radiation pattern.

According to aspects, the antenna arrangement comprises a plurality of dual mode aperture layer apertures. Each dual mode aperture layer aperture comprises three elongated arm sections symmetrically arranged with respect to a center of the aperture. At least two of the dual mode aperture layer apertures are arranged mirrored with respect to each other in a direction along the aperture layer. This arrangement further suppresses unwanted grating lobes.

According to aspects, at least two aperture layer apertures separated from each other by a half guide wavelength. This way, grating lobes can be avoided or minimized.

According to aspects, the mode matching structure, slot layer apertures, and aperture layer apertures are at least partly surrounded by an electromagnetic bandgap (EBG) structure. The EBG structure efficiently seals the gap waveguide passage such that electromagnetic energy can pass more or less unhindered along the intended waveguiding path, but not in any other direction. The arrangement between the radiation layer and the distribution layer may be contactless in that no electrical contact is required between the layers. This is an advantage since high precision assembly is not necessary; the two layers may simply be attached to each other with fastening means such as bolts or the like. Furthermore, electrical contact need not be verified since the repetitive structure seals the transition in a contactless manner.

According to aspects, the EBG structure comprises a repetitive structure of protruding pins. The repetitive structure may, e.g., be machined directly into one of the layers. This is an advantage since such machining can be performed in a cost-effective manner with high mechanical precision. This type of integrally formed repetitive structure is also mechanically stable, which is an advantage.

According to aspects, at least one protruding pin is also acting as a matching pin. This saves space, which is an advantage.

According to aspects, the antenna arrangement comprises a plurality of slot layer apertures being respective slots, wherein every other slot is arranged to couple to one of the modes of the dual mode ridge waveguide and the remainder of slots are arranged to couple to the other of the modes of the dual mode ridge waveguide. The slots are arranged with a spacing of half a guide wavelength, and each slot is arranged to couple to two aperture layer apertures. The aperture layer apertures are arranged with a spacing of half a guide wavelength. This way, the slot layer apertures are fed with the correct phase and the antenna arrangement does not suffer from grating lobes.

There is also disclosed herein an array antenna comprising a plurality of the antenna arrangement according to the discussions above.

These is also disclosed herein a telecommunication or radar transceiver comprising the antenna arrangement according to the discussions above.

These is also disclosed herein a vehicle comprising the antenna arrangement according to the discussions above.

There is also disclosed herein a dual mode ridge waveguide for guiding a radio frequency, RF, signal. The dual mode ridge waveguide comprises two parallel ridges arranged on one waveguide wall and along the waveguide, wherein the two ridges are arranged in proximity to each other to support two modes.

According to aspects, the two ridges in the dual mode ridge waveguide are separated from each other by less than half a free space wavelength, preferably less than a quarter of such wavelength, and more preferably less than a tenth of such wavelength.

According to aspects, in the dual mode ridge waveguide, a recess is arranged in between the two ridges, where a distance from the bottom of the recess to the top of the two ridges is a quarter of a free space wavelength.

According to aspects, the dual mode ridge waveguide is a dual mode ridge gap waveguide.

There is also disclosed herein an antenna arrangement comprising the dual mode ridge waveguide according to the discussions above.

There is also disclosed herein a transition arrangement for transitioning from single mode apertures to dual mode apertures. The transition arrangement comprises a slot layer comprising a plurality of slot layer apertures being respective slots, where the slots are arranged in a column and with a spacing of half a guide (or free space) wavelength, and arranged so that every other slot is orthogonal to the remainder of slots. The transition arrangement also comprising an aperture layer facing the slot layer. The aperture layer comprises a plurality of aperture layer apertures, where the aperture layer apertures being dual mode apertures. Each slot layer aperture is arranged to couple to two aperture layer apertures via a mode matching structure. The aperture layer apertures are arranged with a spacing of half a guide wavelength. The mode matching structure comprises a plurality of matching pins, where at least one pair of matching pins is arranged along the direction of the column, and at least one a pair of matching pins are arranged perpendicular to the direction of the column. The mode matching structure, slot layer apertures, and aperture layer apertures are at least partly surrounded by an electromagnetic bandgap, EBG, structure.

According to aspects, the at least one dual mode aperture layer aperture comprises three elongated arm sections.

According to aspects, the elongated arm sections are symmetrically arranged with respect to a center of the aperture.

According to aspects, the transition arrangement comprises a plurality of dual mode aperture layer apertures, wherein each dual mode aperture layer aperture comprises three elongated arm sections symmetrically arranged with respect to a center of the aperture, and wherein at least two of the dual mode aperture layer apertures are arranged mirrored with respect to each other in a direction along the column.

According to aspects, the EBG structure in the transition structure comprises a repetitive structure of protruding pins.

According to aspects, at least one protruding pin in the transition arrangement is also acting as a matching pin.

There is also disclosed herein an antenna arrangement comprising the transition arrangement according to the discussions above.

There is also disclosed herein methods associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1A:
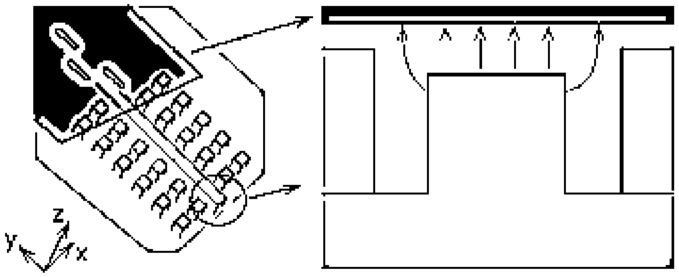
FIGS. 1A and 1B schematically illustrate a slotted ridge gap waveguide (RGW) antenna, as well as the quasi-TEM mode of the RGW, and the equivalent quasi-TEM mode in microstrip technology.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

As mentioned, there is a need for improved antenna arrangements suitable for two polarizations. There is especially a need for a dual polarized antenna element that can provide a full one-dimensional (1D) scanning capability. Although solutions exist for dual-polarized antennas in PCB based technologies, see, e.g., A. H. Aljuhani, et al., "A Scalable Dual-Polarized 256-Element Ku-Band Phased-Array SATCOM Receiver with ±70° Beam Scanning". In: 2018 IEEE/MTT-S International Microwave Symposium-IMS. 2018, pp. 1203-1206. Such solutions, however, are not suitable for higher frequency due to the associated dielectric losses.

The gap waveguide based solutions that have been proposed have either a fixed beam or suffer from large spacing between the elements introducing grating lobes when performing beam-steering, see, M. Ferrando-Rocher, et. al., "8×8 Ka-Band Dual-Polarized Array Antenna based on Gap Waveguide Technology". In: IEEE Transactions on Antennas and Propagation PP (April 2019) and A. Bagheri, et. al., "A ±45° Dual-Polarized Antenna for 5G mmWave Applications Based on Gap Waveguide Technology". In: 2019 International Symposium on Antennas and Propagation (ISAP). 2019, pp. 1-3.

The large element spacing can be circumvented, see N. Aboserwal, et. al., "An Ultra-Compact X-Band Dual-Polarized Slotted Waveguide Array Unit Cell for Large E Scanning Radar Systems". In: IEEE Access 8 (January 2020), pp. 210651-210662. However, such a solution is very complex in terms of manufacturing and is not feasible for large-scale production.

The present disclosure presents antenna arrangements, transition arrangements, and waveguide arrangements suitable for a dual polarized antenna element, e.g., a column of vertical and horizontally polarized apertures. The dual polarized antenna element can have a width less than half a free space wavelength, which allows it to be used in 1D scanning arrays. The disclosed arrangements also respect manufacturing constraints which indicate the feasibility for large-scale manufacturing. The disclosed dual polarized antenna element can present 1-D scanning capabilities similar to that from the SRGW, e.g., +45 degree steering in the azimuth plane or better.

To achieve 1-D scanning, the spacing of the radiating apertures should be less or equal to $0{:}56\lambda_0$ to avoid grating lobes, with $\lambda_0$ being the free space wavelength. It is also desired that the radiation pattern of the antenna element, or element pattern, should have a side lobe level (SLL) below −10 dB. Furthermore, it is desired that the return loss of the antenna should be below −10 dB in the frequency band of operation.

The waveguides disclosed herein may be based on electromagnetic bandgap (EBG) structures (sometimes called metamaterial structures), i.e., be gap waveguides. An EBG structure can replace one or more side walls in a waveguide (e.g., rectangular, ridge etc.) and still confide the wave along an intended waveguiding path. An EBG structure commonly comprises a repetitive structure on a conductive surface arranged to present a high-impedance surface, or ideally an artificial magnetic conductor (AMC). If the high-impedance surface is arranged facing a low-impedance surface (perfect electric conductor in the ideal case) and at a distance less than a quarter free-space wavelength ($\lambda_0/4$), an electromagnetic bandgap is formed, and no electromagnetic mode can propagate intermediate the surfaces. Such bandgap can be used to seal a waveguide passage such that electromagnetic energy can pass more or less unhindered along the intended waveguiding path, but not in any other direction.

An EBG structure may be arranged on one conductive layer, on two conductive layers, or as a separate member between two layers. One advantage with the EBG structure is that two layers may be arranged facing each other in contactless fashion, i.e., no electrical contact is required between the layers. This is an advantage since high precision assembly is not necessary; the two layers may simply be attached to each other with fastening means such as bolts or the like. Furthermore, electrical contact need not be verified since the repetitive structure seals the transition in a contactless manner.

Figure 1B:
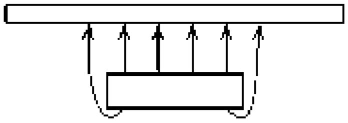
Figure 2A:
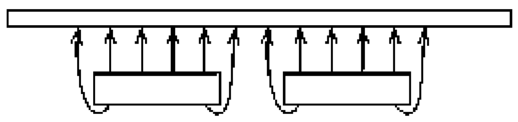
FIGS. 2A-2D show a comparison of the electric fields in a coupled microstrip line and in a dual mode ridge gap waveguide (DMRGW), where the even mode in the coupled microstrip line is shown in 2A, the even mode in the DMRGW is shown in 2B, the odd mode in the coupled microstrip line is shown in 2C, and the odd mode in the DMRGW is shown in 2D.
Figure 2B:
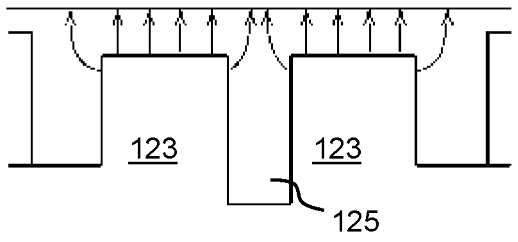
Figure 2C:
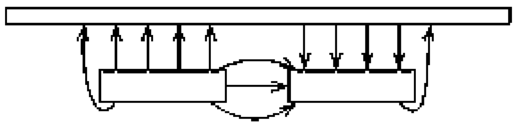
Figure 2D:
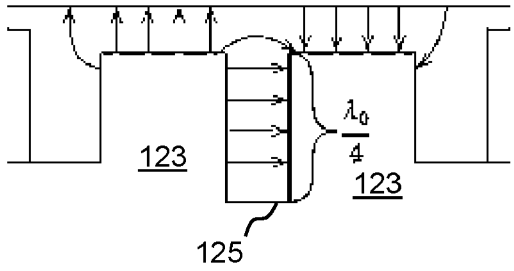

One common EBG structures is the bed of nails (BoN), i.e., a repetitive structure of protruding pins/post. One benefit of this type is that there is no need of a dielectric material. The BoN may be constituted by a unit cell, which contains a metal pin of approximately $\lambda_0/4$ on top of a metal ground plane as shown in FIG. 1A. If a row of pins is removed, a ridge can be added which supports a mode similar to the quasi-TEM mode of a microstrip line (see FIG. 1B), which creates a ridge gap waveguide (RGW). One of antenna which can be created with the RGW is the slotted RGW (SRGW), where slots are placed at alternating sides of the RGW, see, e.g., Thomas A Milligan, Modern antenna design, Wiley-IEEE Press, 2005. Such antenna is typically used in 1-D scanning applications since the width of the waveguide can be close to or even smaller than $\lambda_0/2$, while maintaining isolation between the neighboring waveguides around 20 dB. However, it only radiates one polarization.

To maintain polarization diversity in a dual-polarized antenna, each polarization is typically fed by a separate feeding system. However, with the limitations regarding large-scale manufacturing, it is very difficult to fit two separate feeding systems within the $0.56\lambda_0$ spacing requirements of a 1-D scanning array. Therefore a new concept for a dual mode waveguide is proposed herein, which can support two orthogonal modes to feed the two polarizations.

Figure 20A:
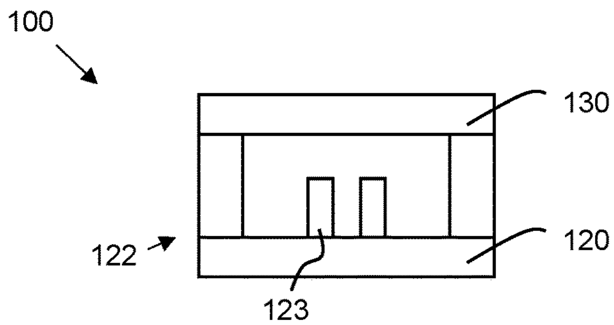
FIGS. 20A-21D schematically illustrates different views of different example antenna arrangements.
Figure 20B:
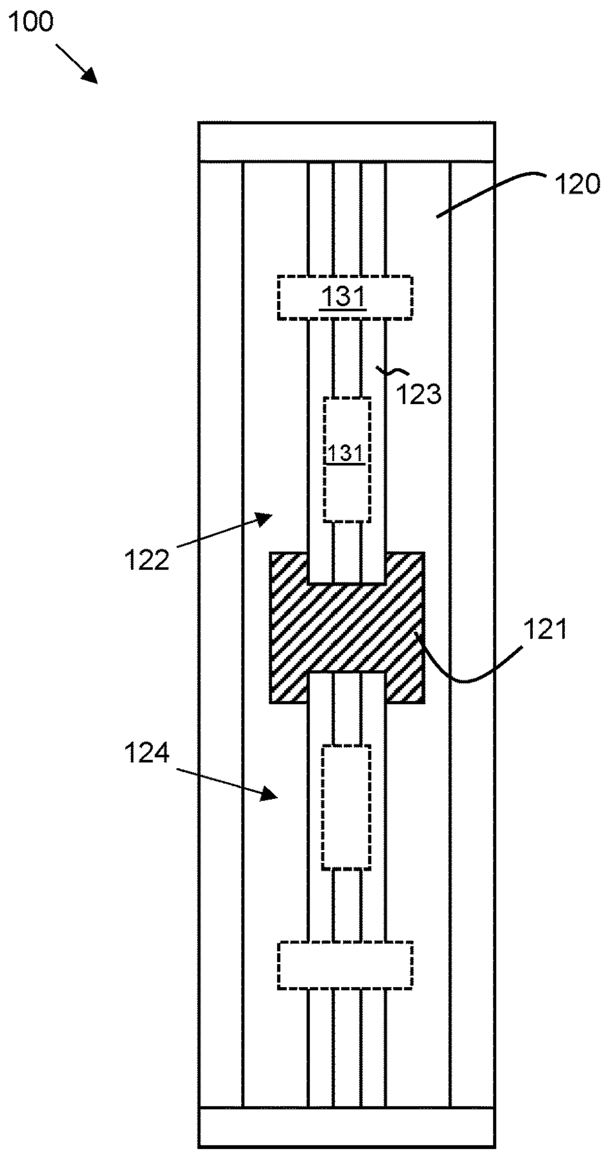
Figure 21A:
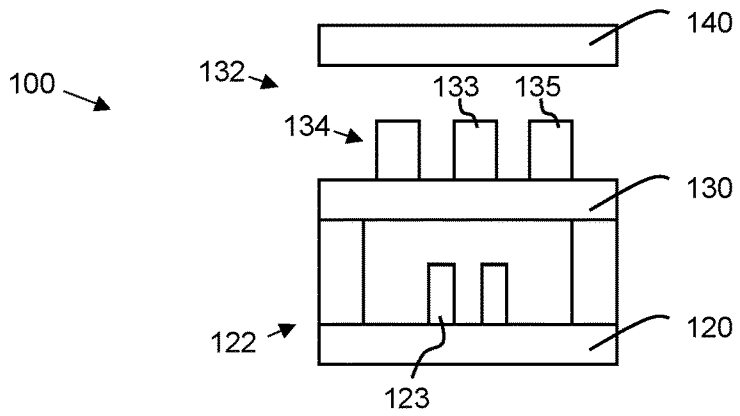
Figure 21B:
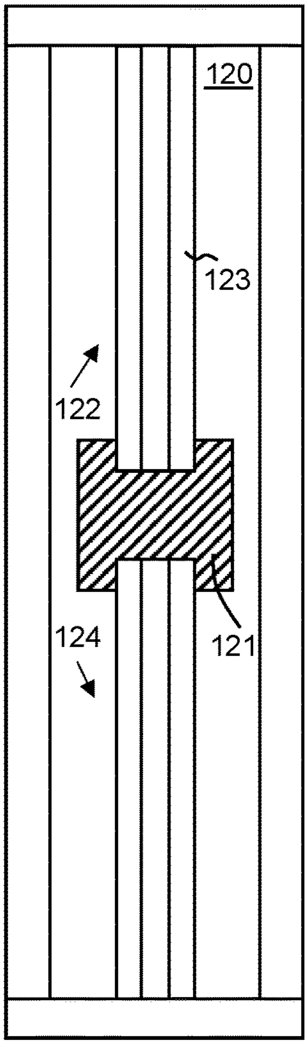
Figure 21C:
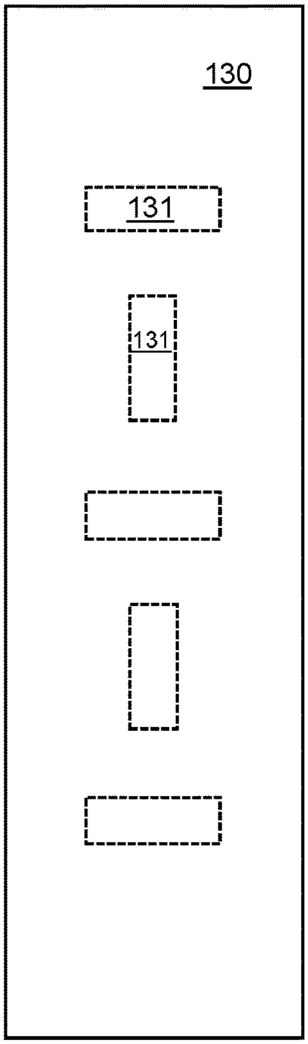
Figure 21D:
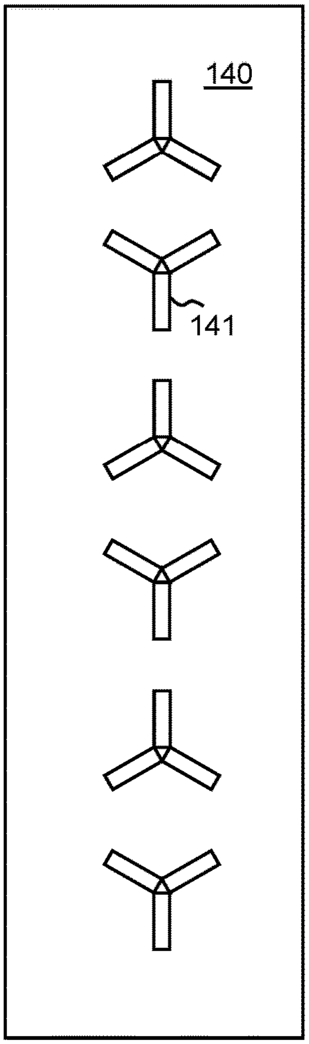

Therefore, there is disclosed herein an antenna arrangement 100 having a layered configuration. An example embodiment is shown with different views in FIGS. 20A and 20B, and another example embodiment is shown in FIGS. 21A-21D. The antenna arrangement 100 comprises a slot layer 130 comprising one or more slot layer apertures 131, and a distribution layer 120 facing the slot layer. The distribution layer is arranged to distribute two radio frequency (RF) signals to the one or more slot layer apertures 131. The distribution layer comprises a distribution layer feed 121 and at least one first waveguide 122 arranged to guide the RF signals between the distribution layer feed and the one or more slot layer apertures 131. The first waveguide 122 is a dual mode ridge waveguide comprising two parallel ridges 123 arranged on the distribution layer 120 and along the first waveguide, where the two ridges are arranged in proximity to each other to support two modes.

According to aspects, the dual mode ridge waveguide is a dual mode ridge gap waveguide (DMRGW) where an EBG structure is arranged along the ridges on the distribution layer and/or on the slot layer. The DMRW can, alternatively, have normal conductive side wall, i.e., be a dual mode hollow waveguide (DMHW). In any case, the mechanisms for supporting two modes, and the mechanisms for the coupling to/from feeding arrangements and to/from apertures are the same.

The proposed dual mode ridge waveguide (DMRW) is inspired by the coupled microstrip line (CML). A view of the even and odd modes in the CML and an example DMRGW are shown in FIG. 2 for comparison. More specifically, FIGS. 2A-2D show a comparison of the electric fields in a coupled microstrip line and in a DMRGW, where the even mode in the coupled microstrip line is shown in 2A, the even mode in the DMRGW is shown in 2B, the odd mode in the coupled microstrip line is shown in 2C, and the odd mode in the DMRGW is shown in 2D.

A recess 125 is preferably arranged between the two ridges, where the recess is arranged to present a high impedance between the ridges, and preferably an open circuit. To achieve this, the recess (could also be called a type of slot) should preferably be $\lambda_0/4$ deep which transforms the short at the bottom of this recess into an open at the top. In other words, the distribution layer 120 in the antenna arrangement 100 may comprise a recess 125 in between the two ridges 123, where a distance from the bottom of the recess to the top of the two rides is a quarter of a free space wavelength. More generally, the ridges are arranged on as protrusions on a plane and the recess 125 extends below the surface of the plane. Herein, the wavelength (free space or guided) normally corresponds to a center frequency in a band of operation, but can also be defined as the frequency edges in the band. The distance being a quarter of a free space wavelength is interpreted broadly. According to aspects, the distance from the bottom of the recess to the top of the two rides is within 25 percent of a quarter of a free space wavelength, preferably within 10 percent, more preferably within 5 percent.

The two parallel ridges 123 are arranged on the distribution layer 120, which is different from a double ridge waveguide with two ridges arranged on opposite sides (walls) of the waveguide and arranged with their respective top surfaces facing each other. The two parallel ridges 123 in the DMRW are in proximity to each other to support two modes in a frequency band of operation. This means that the two ridges are close enough in proximity so that energy from one ridge passes to the other, and so that two different electromagnetic modes can propagate along the waveguide (i.e., along both ridges), such as the odd and even modes shown in FIGS. 2B and 2D, respectively. According to aspects, the two ridges 123 are separated from each other by less than half a free space wavelength, preferably less than a quarter of such wavelength, and more preferably less than a tenth of such wavelength.

The slot layer apertures may be apertures arranged to radiate into the air or they may be used for directing electromagnetic energy into another layer. In any case, the slot layer apertures may be single mode apertures, like a slot, or a dual mode aperture, like a tripole-like aperture discussed below.

The distribution layer is arranged to distribute two radio frequency (RF) signals to the one or more slot layer apertures 131 via respective modes along the first waveguide. For example, one transmission signal can be distributed via the odd mode to a first polarization in the radiated antenna pattern and one reception signal can be distributed via the even mode from a second polarization in the antenna pattern.

Figure 3A:
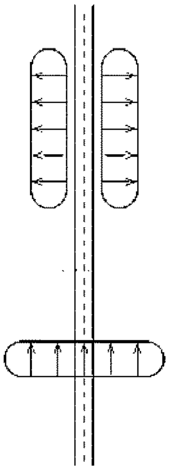
FIGS. 3A-3C show an excitation of waveguide slots above a ridged waveguide, where the slots above an ridge gap waveguide (RGW) is shown in 3A, the slots above a dual mode ridge gap waveguide (DMRGW) excited with the even mode is shown in 3B, and the slots above an DMRGW excited with the odd mode is shown in 3C.
Figure 3B:
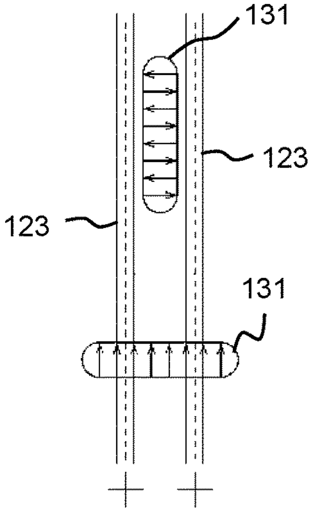
Figure 3C:
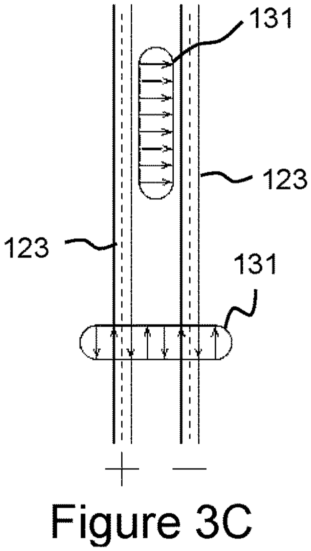

If coupling effects are ignored between the ridges of the DMRW, the operation of the waveguide is similar to two separate RGW's. Since the SRGW can feed into resonant slots similar to those in rectangular waveguides, see T. A. Milligan, Modern antenna design, Wiley-IEEE Press, 2005, the disclosed antenna arrangement may excite two orthogonal slots similar to the bifurcated waveguide in A. J. Sangster, Compact Slot Array Antennas for Wireless Communications, Springer, Cham, 2019. This excitation is shown in FIG. 3 for the DMRW, together with the excitation of the slots in an RGW for comparison. More specifically, FIGS. 3A-3D show an excitation of waveguide slots above a ridged waveguide, where the slots above an RGW is shown in 3A, the slots above a DMRW excited with the even mode is shown in 3B, and the slots above an DMRW excited with the odd mode is shown in 3C.

When placing both slots in the center of the DMRW, only one of the two slots will be exited in phase from both modes. The other slot will be excited with fields that are out of phase, canceling the fields in the slots. With disclosed DMRW concept, the even mode can be used to excite a vertical polarization (VPol), while the odd mode excites a horizontal polarization (HPol). Unlike the CML, the DMRW may be designed to have equal guided wavelength $\lambda_g$ for both modes, which is a major advantage. This may be done by controlling the depth of the recess between the ridges. An equal guided wavelength allows for uniform spacing between the slot layer apertures above the DMRW.

Figure 4A:
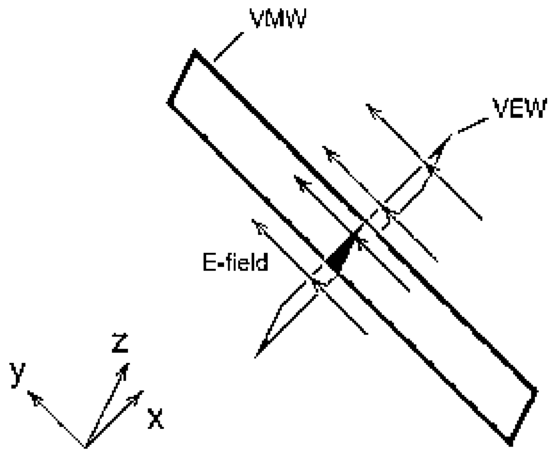
FIGS. 4A and 4B show a virtual electric wall (VEW) and virtual magnetic wall (VMW) induced by the mirror symmetry in the x,z and y,z planes, together with the main electric field orientation for vertical polarization in 4A and for horizontal polarization in 4B.
Figure 4B:
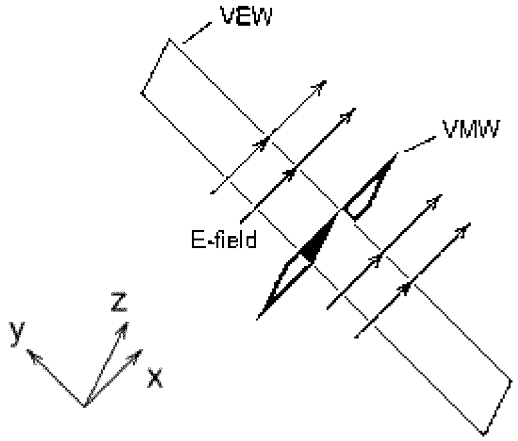

To ensure high isolation between the modes, symmetry in the waveguide should preferably be kept throughout the antenna. With image theory from C. A. Balanis, Antenna theory: analysis and design, John Wiley & sons, 2016, it can be concluded that a symmetry plane may act as a virtual electric wall (VEW) or virtual magnetic wall (VMW). These walls typically ensure that the energy cannot crossover between the modes. Looking at the field distribution in the DMRW, it can be concluded that the even mode has a VMW and the odd mode has a VEW through the center of the waveguide. If this symmetry is kept throughout the entire antenna, the same virtual walls should also ensure a high ratio between the co- and cross-polar components (Co/Cx) in the radiation pattern along the elevation plane. With a second symmetry plane through the center of the antenna, the respective VEW and VMW for VPol and HPol ensure high Co/Cx in the azimuth plane as well. FIG. 4 shows these virtual walls with respect to the radiated electric fields for the two polarizations. The DMRW should be placed along the y-direction to support the even mode for VPol and the odd mode for HPol.

The process to manufacture the parts of the DMRW may be CNC milling, which can achieve small tolerances, such as ±20 μm, which is an important requirement for mmWave antennas. A constraint for milling relates the maximum depth of cut ($d_c$) to the radius of the milling tool ($r_t$). As a rule of thumb, the following condition should be met $$\frac{d_c}{r_t} \le 10.$$

If this ratio is exceeded, the parts usually cannot be milled, or the tolerance of the cut goes up beyond acceptable range. When designing an antenna for large-scale manufacturing, CNC milling may not economically feasible. Therefore, a mold can be created of the antenna for die casting or injection molding. For the molten metal to be able to flow into this mold and to prevent warping, the features should not be very thin and long. For the upstanding ridges and possible pins of the BoN, a constraint may be set where the height of such a feature should not be greater than two times its width.

According to aspects, considering the manufacturing constraints mentioned above, the cut-off frequency of the odd mode in the DMRW can result in $\lambda_g > 1.3\ \lambda_0$. The slot layer apertures above the waveguide need to be placed $\lambda_g$ apart for the apertures to be excited in phase. However, if such apertures would be arranged to radiate into the air, grating lobes will appear in the radiation pattern along the elevation plane (i.e., in a plane along the waveguide). Depending on the application, this is not always necessarily a problem. Therefore, at least two slot layer apertures 131 of the disclosed antenna arrangement 100 may be separated from each other by a guide wavelength. This normally means within 25 percent of the guide wavelength, preferably within 10 percent, and more preferably within 5 percent.

If the slot layer apertures are arranged to radiate, they are preferably arranged separated from each other by a guide wavelength and are preferably dual mode apertures. This way, the antenna arrangement can radiate two polarizations via the two modes supported by the DMRW. Furthermore, the dual mode slot layer aperture may be a tripole-like aperture. In other words, the at least one dual mode slot layer aperture 131 may comprise three elongated arm sections. Furthermore, the elongated arm sections are symmetrically arranged with respect to a center of the aperture.

The tripole-like apertures may be arranged in mirrored pairs along the waveguide. This suppresses grating lobes when such apertures are radiating, which is discussed in more detail below. In other words, the antenna arrangement 100 may comprise a plurality of dual mode apertures 131, where each dual mode comprises three elongated arm sections symmetrically arranged with respect to a center of the aperture, and where at least two of the dual mode apertures are arranged mirrored with respect to each other along the first waveguide 122.

In some applications, grating lobes in the elevation plane are undesired. Therefore, an additional layer may be arranged on top of the slot layer aperture suppress the grating lobes. Such layer can additionally be used to increase the directivity of the antenna arrangement. To differentiate the layers, the lid above the DMRW where the slot layer apertures are placed, is referred to as the slot layer. Since the apertures in this slot layer may be used to couple the energy to this additional layer, the apertures in this layer will be referred to as coupling slots. Although they are called coupling slots, many other types of apertures could be used. The additional layer is called "aperture layer" since it comprises radiating apertures. More specifically, the antenna arrangement 100 may comprise an aperture layer 140, where the aperture layer comprises one or more aperture layer apertures 141, wherein the one or more slot layer apertures 131 are arranged to couple to the one or more aperture layer apertures via a mode matching structure 132. The mode matching structure is a structure that guides the electromagnetic waves (fields) such that the respective modes are coupled correctly to the aperture layer apertures. For example, guiding respective modes of the first waveguide to be radiated as respective polarizations from the aperture layer apertures. The mode matching structure may be arranged on the slot layer and/or the aperture layer, or between (i.e., floating). The mode matching structure may comprise a plurality of rectangular protrusions or such.

According to aspects, at least two slot layer apertures 131 separated from each other by half a guide wavelength. This normally means within 25 percent of the guide wavelength, preferably within 10 percent, and more preferably within 5 percent. Such arrangement can be preferable if every other slot layer aperture couples to different modes of the DMRW. In that case, every other slot layer aperture (coupling the same mode) is arranged with a separation of a full guide wavelength, which enables excitement in phase. Naturally, the slot layer apertures may be separated with any distance in the general case. Furthermore, the separation between two apertures may vary along the waveguide.

The slot layer apertures may be slots, where a single slot is arranged to couple a single mode of the DMRW. This can be desirable if the slots are arranged to radiate into the air of if they are coupling slots. More specifically, the antenna arrangement 100 may comprise at least two slot layer apertures 131 being respective slots, where the two slots are arranged to couple to respective modes of the dual mode ridge waveguide. Preferably, one of the two respective slots 131 is arranged extending along the first waveguide 122 and the other slot is arranged extending orthogonal with respect to the first waveguide. The slot layer slots may be any type of slot, such as rectangular or oval, be a folded slot, like a dumbbell-shaped, S-shaped, U-shaped, or Z-shaped slot. It is especially beneficial to if slots extending perpendicular to the extension direction of the waveguide are folded since this reduces the width of the column.

To suppress the grating lobes and to increase the directivity of the antenna arrangement in the extension direction of the waveguide, the effective area of the radiating apertures should be increased along the y-axis. However, the radiating apertures should fit within $\lambda_g$ to be able to add use multiple slots. Size and manufacturing constraints may make it unfeasible to have separate apertures for VPol and HPol. Therefore, a dual mode aperture can be chosen for at least one of the aperture layer apertures 141. Unfortunately, many dual mode apertures support a third mode, which typically radiates into the direction of the grating lobes which need to be suppressed.

Figure 5A:
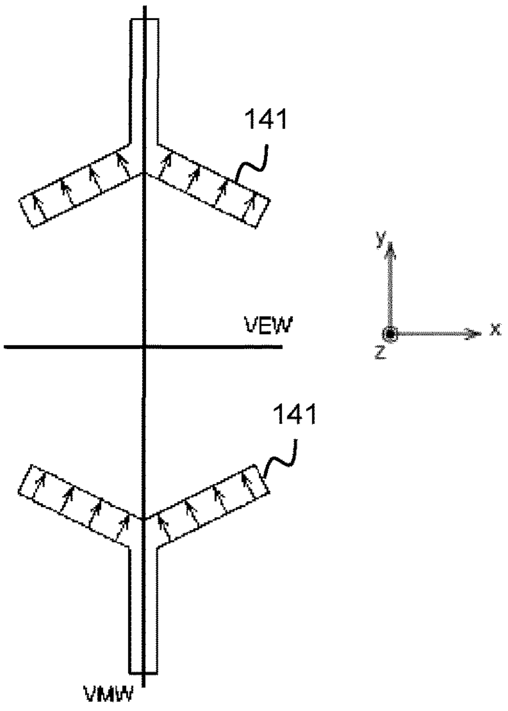
FIGS. 5A and 5B show a symmetrical aperture layout for a tripole-based aperture layer with corresponding electric field distribution, for vertical polarization in 5A and for horizontal polarization in 5B.
Figure 5B:
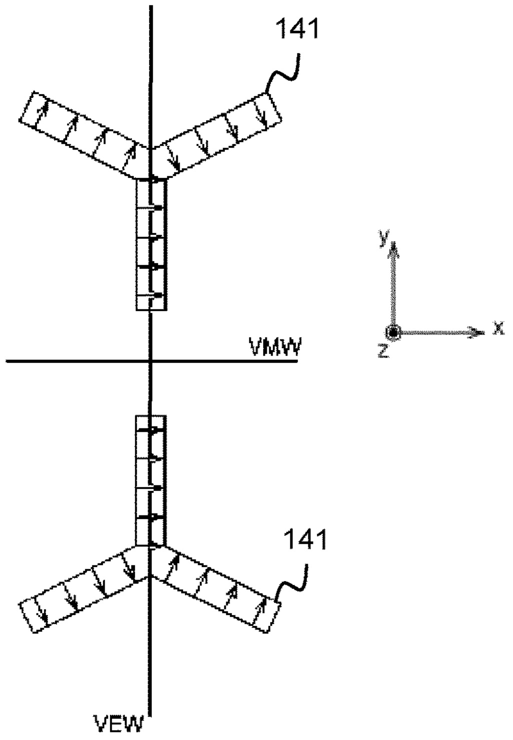

Furthermore, the dual mode slot layer aperture may be a tripole-like aperture. In other words, at least one dual mode aperture layer aperture 141 may comprise three elongated arm sections. Furthermore, the elongated arm sections are symmetrically arranged with respect to a center of the aperture. The elongated arms may be folded similar to a folded slot. The tripole-like antenna is advantageous since this structure does not support the unwanted third mode within the frequency band. However, this aperture is not symmetrical in the two main planes, which results in a reduction in the Co/Cx. To solve this, two tripoles can be used for each coupling slot which are mirrored in the x,z plane as shown in FIG. 5. This also increases the effective area to suppress the grating lobes. In other words, the antenna arrangement 100 may comprise a plurality of dual mode aperture layer apertures 141, where each dual mode aperture layer aperture comprises three elongated arm sections symmetrically arranged with respect to a center of the aperture, and where at least two of the dual mode aperture layer apertures are arranged mirrored with respect to each other in a direction along the aperture layer 140.

To suppress grating lobes, at least two, but preferably all, aperture layer apertures 141 separated from each other by a half guide wavelength. This can mean within 25 percent of a half guide wavelength, preferably within 10 percent, more preferably within 5 percent.

Figure 6A:
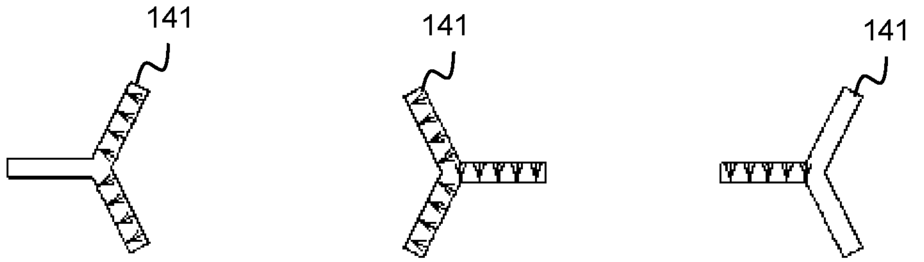
FIGS. 6A-6C schematic illustrate a mode matching structure with an aperture layer on top of a slot layer, with a top view in 6A, a side view in 6B, and a bottom view in 6C.
Figure 6B:
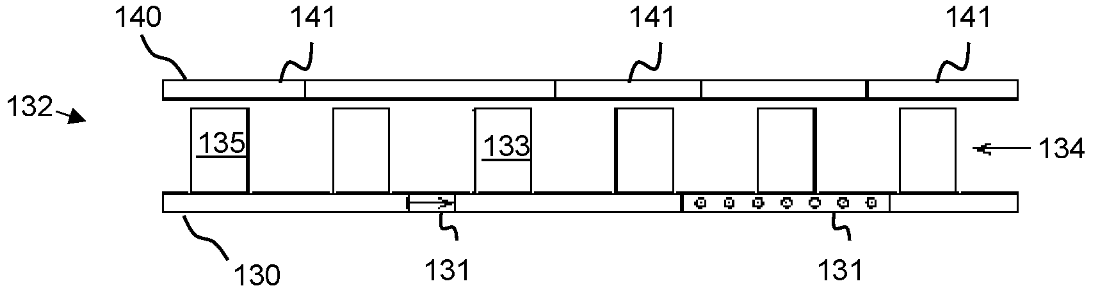
Figure 6C:
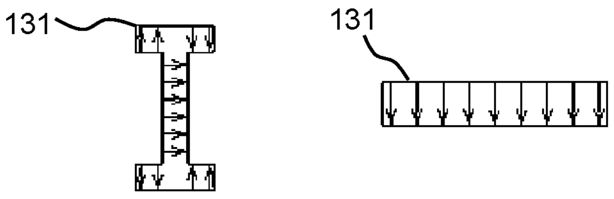

To feed the aperture layer from the coupling slots, the modes of the coupling slots 131 should be matched to the corresponding mode of the aperture layer aperture 141. This can be achieved with a mode matching structure 132. Since the energy should ideally be coupled entirely from the coupling slots above the DMRW to the aperture layer apertures, there should be no propagation along and between the slot layer 130 and the aperture layer 140. To achieve this, a BoN structure, or other EBG structures, may added to the slot layer as shown in FIG. 6. In other words, the mode matching structure 132, slot layer apertures 131, and aperture layer apertures 141 may be at least partly surrounded by an (EBG) structure 134. According to aspects, this EBG structure 134 comprises a repetitive structure of protruding pins 135, i.e., BoN pins. The placement of individual BON pins should not be done so that a coupling slot or an aperture layer aperture is blocked by the pins.

Figure 7A:
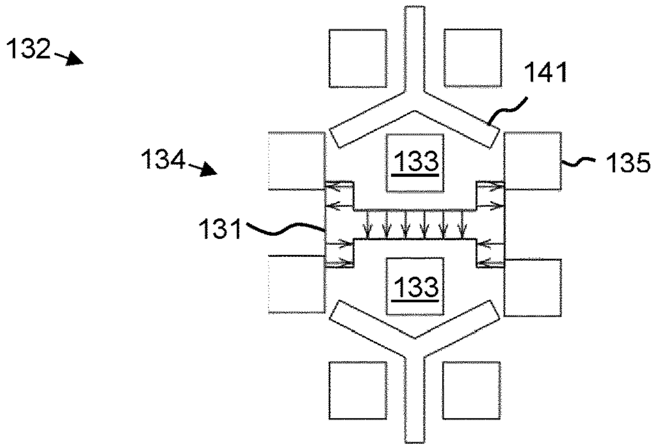
FIGS. 7A-7C show mode matching between a slot layer and an aperture layer through a bed of nail (BoN) structure for vertical polarization, where the electric field distribution in the slot layer is shown in 7A, the electric field distribution between the pins of the BoN structure is shown in 7B, and the electric field in the aperture layer is shown in 7C.
Figure 7B:
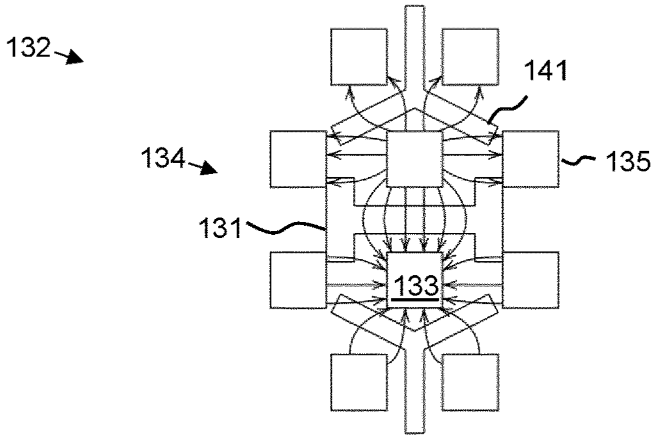
Figure 7C:
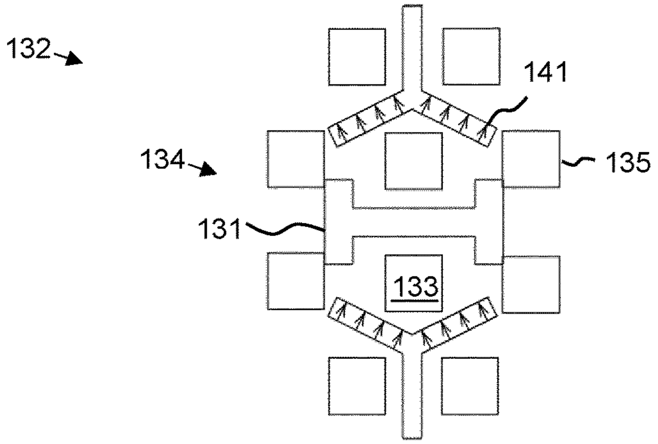

To elaborate on the placement of the pins, the polarizations will be taken separately to discuss the operation of the mode matching structure. For vertical polarization, FIG. 7A shows an example design of the aperture layer, around a coupling slot for VPol. To prevent propagation between the slot layer and aperture layer, a set of pins is placed around the slot. To guide the electric field lines towards the aperture slots in the aperture layer, the mode matching structure 132 may comprise at least one matching pin 133. This applies for any polarization. In FIGS. 7A-7C, two matching pins 133 have been added. In particular, the mode matching structure 132 may comprise a pair of matching pins 133 arranged along the direction of the first waveguide 122. FIG. 7B shows the electric field lines which are supported with the addition of these two matching pins. The overlap between the electric field in the slots and between the pins is clearly shown. This overlap results in electromagnetic coupling, which can be tuned with the size and position of the matching pins. Lastly, the matching pins may be made slightly shorter than the BoN pins to decrease the sensitivity to fluctuation in the gap between the BoN and the aperture layer. As further can be seen in FIGS. 7B, some of the BoN pins surrounding the coupling slot also support an electrical field strength. In other words, at least one protruding pin 135 of the BoN may also act as a matching pin.

Figure 8A:
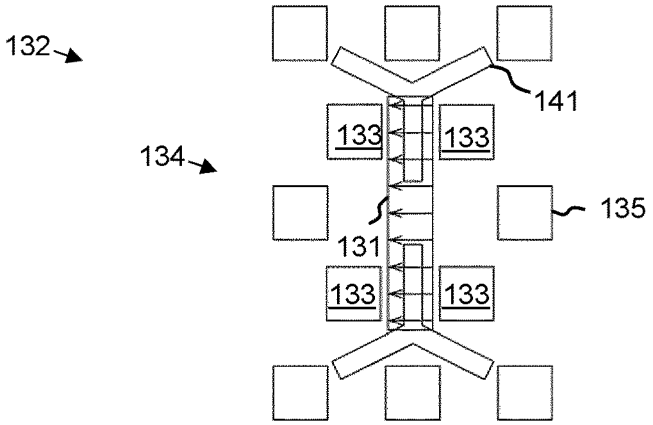
FIGS. 8A-8C show mode matching between a slot layer and an aperture layer through a bed of nail (BoN) structure for horizontal polarization, where the electric field distribution in the slot layer is shown in 8A, the electric field distribution between the pins of the BoN structure is shown in 8B, and the electric field in the aperture layer is shown in 8C.
Figure 8B:
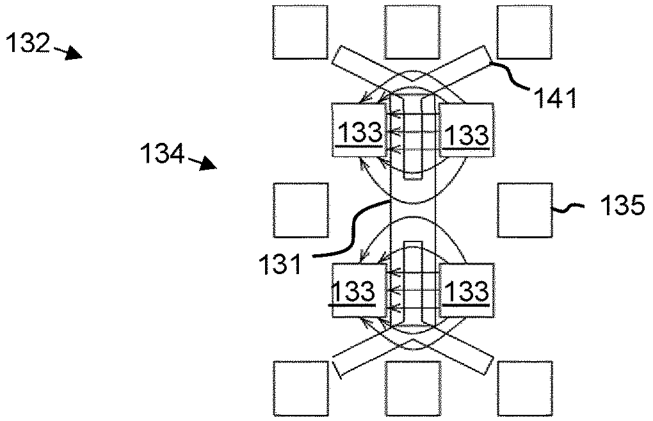
Figure 8C:
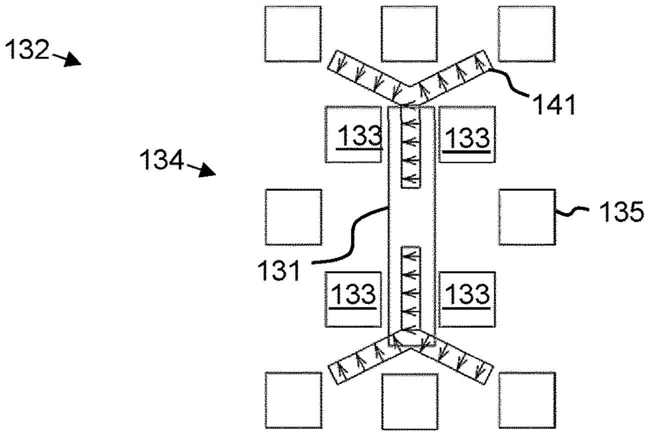

Regarding horizontal polarization, the operational principle of the coupling between the coupling slot and aperture slots for HPol is very similar to that of VPol. An example is illustrated in FIGS. 8A-8C, where a set of BoN pins 135 is added to prevent unwanted propagation between the aperture and slot layers, and four matching pins 133 are added to guide the electric field lines toward the aperture. In other words, the mode matching structure 132 may comprise at least one pair of matching pins 133 arranged perpendicular to the direction of the first waveguide 122. Similar to VPol, coupling between the aperture slots and the coupling slot is created by the overlapping electric fields in the slots and between the pins. Furthermore, the size and position of the matching pins can be changed to achieve matching. The one or matching pins may also have more general shapes, like a ridge extending along the slot.

Figure 9A:
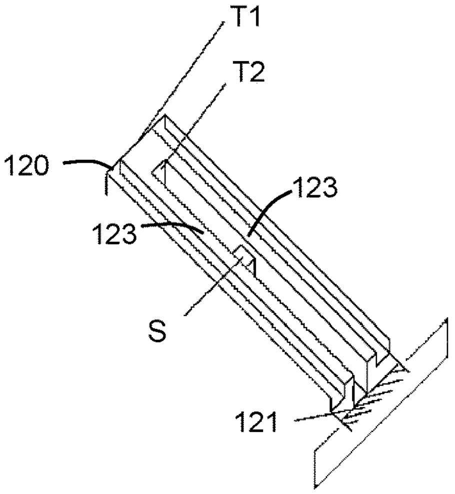
FIGS. 9A-9C schematic illustrate a view of half of an example antenna element, which can be mirrored in the x,y plane to get a full antenna element, where a bottom layer comprising the dual mode ridge waveguide (DMRG) is shown in 9A, a slot layer with a bed of nails (BoN) arranged on top of the bottom layer is shown in 9B, and an aperture layer with dual mode tripole-like antennas arranged on top of the slot layer is shown in 9C.
Figure 9B:
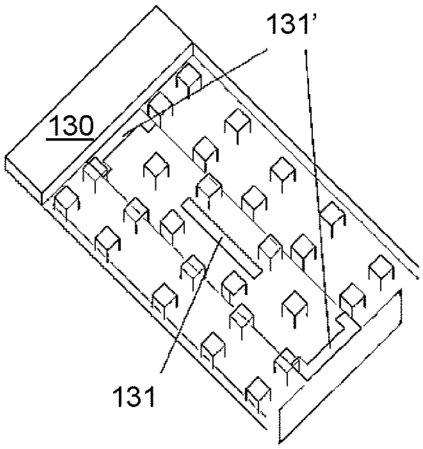
Figure 9C:
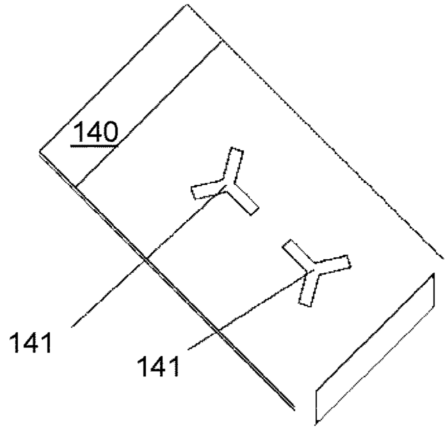

FIGS. 9-16 show various aspects of an example embodiment of the antenna arrangement. The antenna arrangement comprises three coupling slots for VPol and two coupling slots for HPol. The coupling slots are connected with DMHW. This DMHW is the equivalent of the DMRGW, but in hollow waveguide technology, where the BoN is replaced by a metal wall. This setup is shown in FIG. 9. More specifically, FIGS. 9A-9C schematic illustrate a view of half of an example antenna element, which can be mirrored in the x,y plane to get a full antenna element, where a bottom layer comprising the dual mode ridge waveguide (DMRG) is shown in 9A, a slot layer with a bed of nails (BoN) arranged on top of the bottom layer is shown in 9B, and an aperture layer with dual mode tripole-like antennas arranged on top of the slot layer is shown in 9C. In FIG. 9B, the slots 131' have U-shapes. If the antenna element is mirrored the x,y plane, the slot 131' closest to the feed 121 will have an I-shape.

Figure 10A:
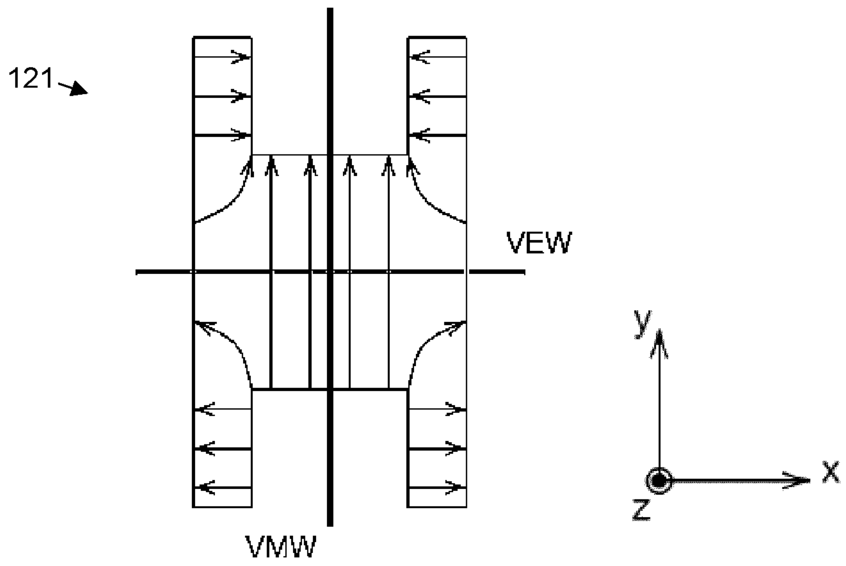
FIGS. 10A and 10B show electric field distributions of the dual mode feeding port with the virtual electric and magnetic walls, for vertical polarization in 10A and horizontal polarization in 10B.
Figure 10B:
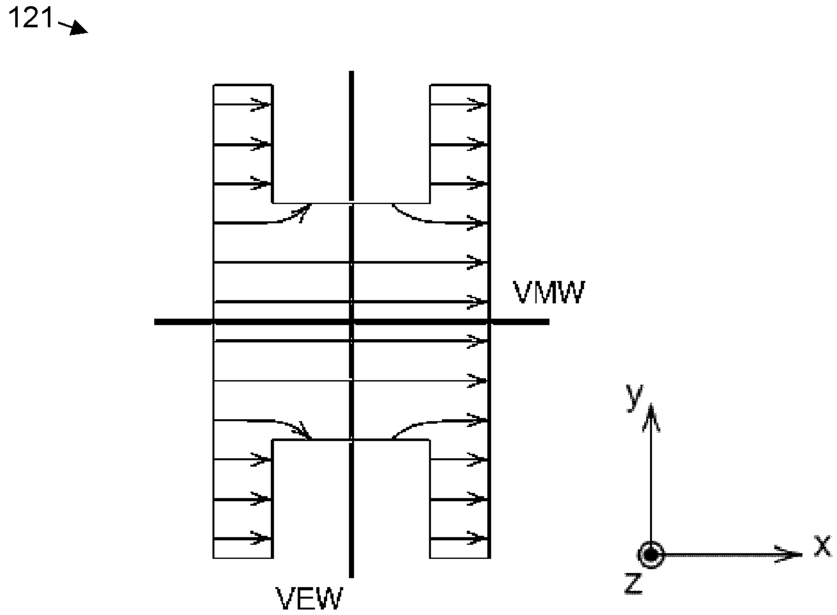

The DMHW is fed from the center to increase the bandwidth and remove frequency scanning. To accomplish this, a dual mode feeding port is utilized which is shown in FIG. 10. In this example, the distribution layer feed 121 is a through hole extending through the distribution layer arranged to support two modes. The first mode of this waveguide feed port is a double ridged waveguide mode which is typically used in the SRGW, this mode can be used to feed VPol. The second mode of this waveguide port is very similar to a rectangular waveguide mode and can be used to feed HPol. In other words, the distribution layer feed comprises a double ridge waveguide arranged to support a double ridge waveguide mode and a rectangular waveguide mode. As a common practice for the SRGW, the dimensions of the waveguide near the feeding port can be changed to achieve matching. This approach is also taken to achieve impedance matching for this antenna.

In particular, the example embodiment of FIGS. 9-16 comprises a plurality of slot layer apertures 121 being respective slots. Every other slot is arranged to couple to one of the modes of the dual mode ridge waveguide and the remainder of slots are arranged to couple to the other of the modes of the dual mode ridge waveguide. The slots are arranged with a spacing of half a guide wavelength, and each slot is arranged to couple to two aperture layer apertures 141. The aperture layer apertures are arranged with a spacing of half a guide wavelength.

The distribution layer feed may be other types of feeds as well. In general, the distribution layer feed 121 should comprise a differential feed arranged to feed the two modes of the DMRW. As another example, the two ridges of the DMRW may be fed by respective ridge waveguides. In that case, the two ridge waveguides may initially be separated to not couple to each other, and gradually be arranged closer to each other, to finally connect to the DMRW. These ridge waveguides may be ridge gap waveguides, which provides isolation where it is needed.

The DMHW should also be properly terminated at either end to ensure proper coupling into the slot layer apertures. To excite the coupling slots for VPol, the surface current on the slot layer should run in the y-direction (along the direction of propagation in the waveguide). This occurs when the DMHW is shorted and thus the termination for VPol can be created by a metal wall. To excite the coupling slots for HPol, the surface current should run in the x-direction (perpendicular to the extension of the waveguide). This is maximized at an open circuit termination. To achieve this, the odd mode of the DMHW can be shorted at $\lambda_g/4$ further than the actual slot, the distance between the short and the slot transforms the short circuit to an open which is needed for the termination. This mode should not be shorted with a full metal wall since this would also short the even mode for VPol at an unwanted place. Because of this, the short for HPol is only placed between the two ridges. Since most of the energy of the odd mode is concentrated between the two ridges, the short in the ridge is very similar to a short across the full waveguide but needs some iterative adjustments to optimize the termination.

In other words, one end of the first waveguide 122 may connected to the distribution layer feed 121 and the other end comprises a dual mode termination. Furthermore, the dual mode termination may comprise a first conductive wall T2 arranged between the ridges and a second conductive wall T1 arranged to short the first waveguide 122, wherein the second wall is arranged at a distance from the first conductive wall. According to aspects, the first conductive wall T2 is arranged in proximity to a slot layer aperture 131 and the second conductive wall T1 is arranged at a quarter of a guide wavelength from another slot layer aperture 131. The conductive walls may be similar to normal waveguide walls, or they may comprise an EBG structure. The distance is interpreted broadly and normally is within 25 percent of at a quarter of a guide wavelength.

Due to the limited space and manufacturing constraints, it may be relevant to improve the impedance matching for HPol. To solve this issue, a septum can be arranged to the DMRW between the ridges and in proximity to (or directly below) a slot layer aperture 131. This is similar to the septum which is often used in an H-plane waveguide tee, see, e.g., G.-L. Huang, et al. "Design of a symmetric rectangular waveguide T-junction with in-phase and unequal power split characteristics". In: 2013 IEEE Antennas and Propagation Society International Symposium (APSURSI). 2013, pp. 2119-2120. Since there is very little energy concentrated between the ridges for VPol, the addition of this septum is not seen by VPol. Thus with this addition, HPol can be matched almost entirely independently of VPol.

According to aspects, one of the slot layer apertures is placed directly above the feeding port. This may be done to create uniform spacing between the slot layer apertures, which may result in uniform spacing of the aperture layer apertures when the mode matching structure is used. This optimizes the effective area of the column and reduces the amplitude of possible of side lobes, which may be introduced when a large spacing is present between two respective apertures in the center of the column.

The setup as described above has been designed and simulated in CST Studio Suite. Although the DMHW is used in this design, this way the design can be transferred to a gap waveguide implementation with the DMRGW, without major changes in the design.

Figure 11:
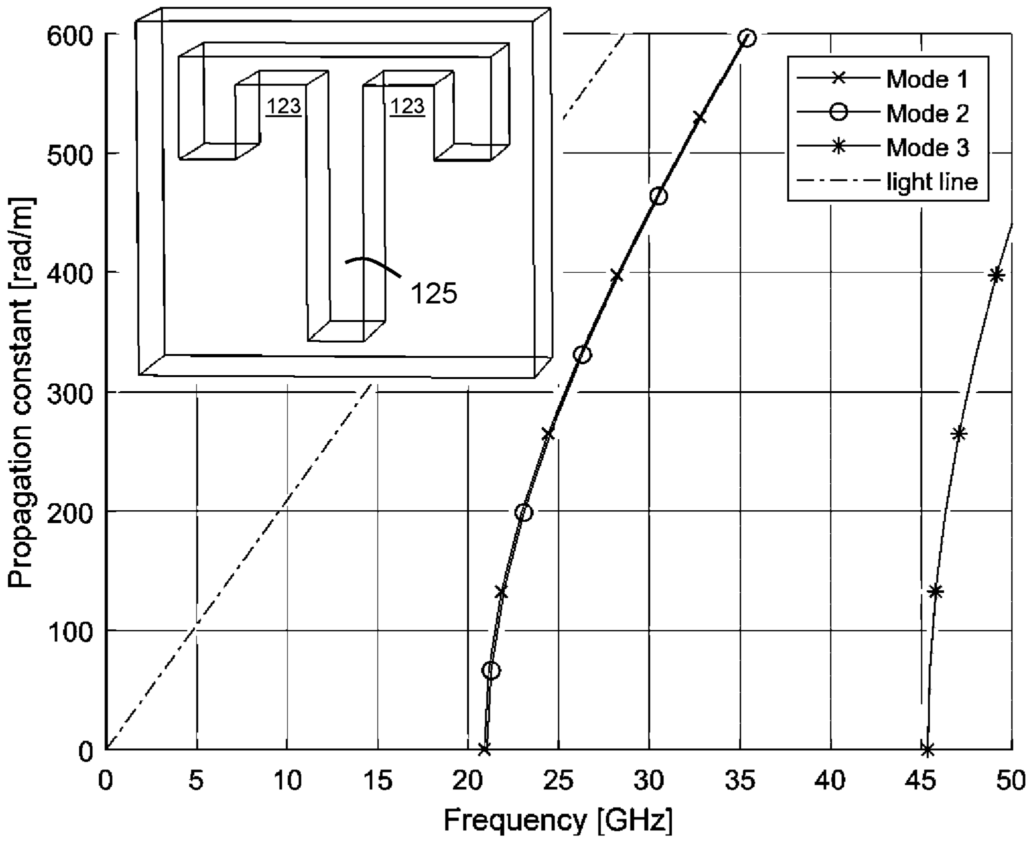
FIG. 11 shows a dispersion diagram of the first three propagating modes in a dual mode hollow waveguide.

FIG. 11 shows a dispersion diagram of the first three propagating modes in the example DMHW. It can be seen that two propagating modes are present in the waveguide within the frequency band of interest. Furthermore, the propagation constant has been designed to be approximately equal for the two modes which results in approximately equal guided wavelength. It can be seen that the cut-off frequency is approximately 21 GHz for both modes, which leaves a 20% margin towards the lowest frequency of operation. This is usually preferred to reduce dispersion within the operational frequency band.

Figure 12:
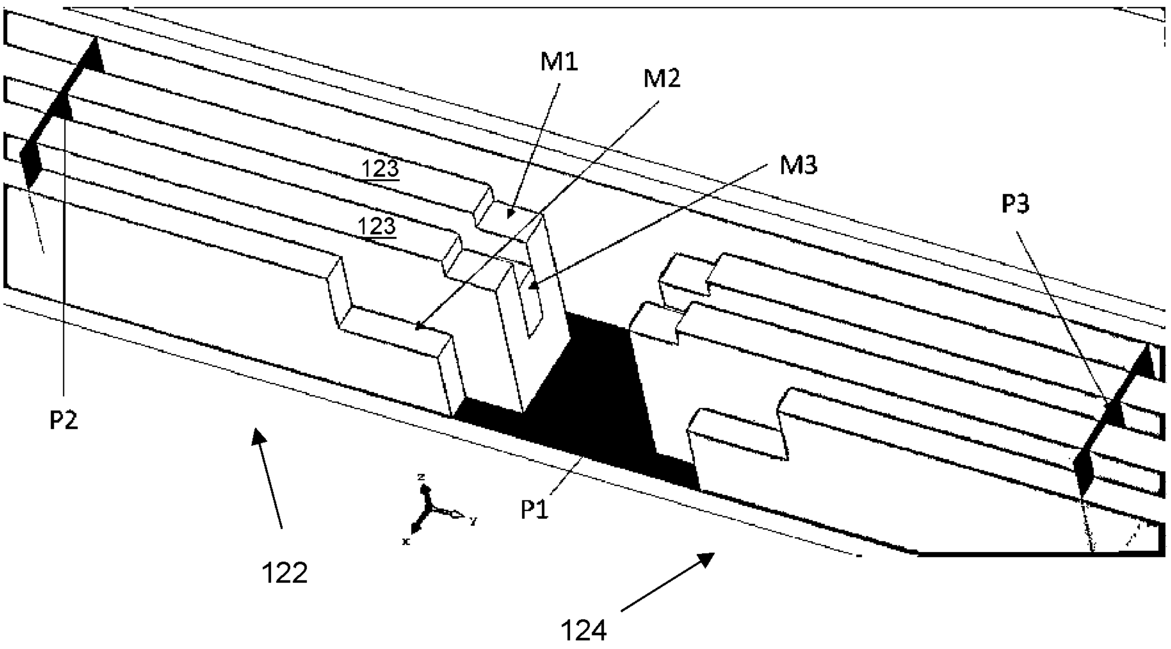
FIG. 12 shows a center feeding transition where the top and one of the sides walls have been removed, where waveguide ports P1, P2 and P3, together with matching structures M1, M2 and M3 are shown.

The feeding transition is from the dual mode feeding port into the DMHW is shown in FIG. 12. It can be seen that the disclosed antenna arrangement 100 may comprise a second waveguide 124 arranged extending in the same direction as the first waveguide 122, where the distribution layer feed 121 is arranged between the first and the second waveguides, and where the second waveguide 124 is a dual mode ridge waveguide comprising two parallel ridges arranged on the distribution layer and along the second waveguide, where the two ridges are arranged in proximity to each other to support two modes.

The waveguide dimensions near the distribution layer feed 121, i.e., the feeding port P1, are modified, as denoted by M1, M2 and M3. These matching features are optional. In other words, one or more matching structures M1, M2, M3 may be arranged in proximity to an end of the first waveguide 122 and/or second waveguide 124 connected to the distribution layer feed 121. The matching structures are arranged on a location to affect the matching between the feed and the waveguide. The notch cut in the waveguide M1 acts like a similar matching structure usually found in the SRGW, in which the impedance of the waveguide is locally changed to achieve matching. The notch cut M1 is preferable less than a quarter of a guided wavelength deep and more preferably less than a tenth of such wavelength. The length (along the ridge) of M1 is preferably less than half a guided wavelength, more preferably less than quarter of such a wavelength and even more preferably a tenth of such a wavelength. This structure is effective for matching the even mode of the DMHW.

The notch cut M2 is added to achieve matching for the odd mode, in combination with the septum M3. The notch cut M2 is preferably less than a quarter of a guided wavelength deep and more preferably less than a tenth of such wavelength. The length of M2 is preferably less than half a guided wavelength and more preferably less than quarter of such a wavelength.

M3 is preferably less than half a guided wavelength in length, more preferably less than quarter of such a wavelength and even more preferably a tenth of such a wavelength. It should preferably not protrude above the ridges 123 with a height from the top of M3 to the top of the ridge preferably less than a quarter of a free space wavelength and more preferably a tent of such a wavelength.

Without M3, the feeding port may leak into the DMHW out of phase with the excitation through M2, thus reducing the coupling between the feeding port and the DMHW. Therefore M3 is preferable for proper operation of the transition. With the addition of these matching structures, a return loss below-10 dB for both polarizations is achieved in the entire frequency band as shown in FIG. 13.

The transition from the feeding port to the coupling slots is helped by the terminations for VPol and HPol as well as the septum S. S is preferably less than a quarter of a guided wavelength and more preferably a tenth of such a wavelength. It should preferably not protrude above the ridges 123 with a height from the top of S to the top of the ridge preferably less than a quarter of a free space wavelength, more preferably a tenth of such a wavelength.

The introduction of the septum adds parasitic inductance, which can be counteracted by increasing the distance between the termination and the coupling slot for HPol. By doing this, the termination is not transformed to an open circuit completely but is seen partly capacitive. It can also be seen that the coupling slots for VPol are not straight slots. The distance between the walls at either side of the waveguide is normally smaller than $\lambda_0/2$, which results in a cut-off frequency which may be too high. The slots in the example embodiment are capacitively loaded with the legs at the ends of the slots (i.e., being folded slots), which lowers the cut-off frequency.

Figure 13:
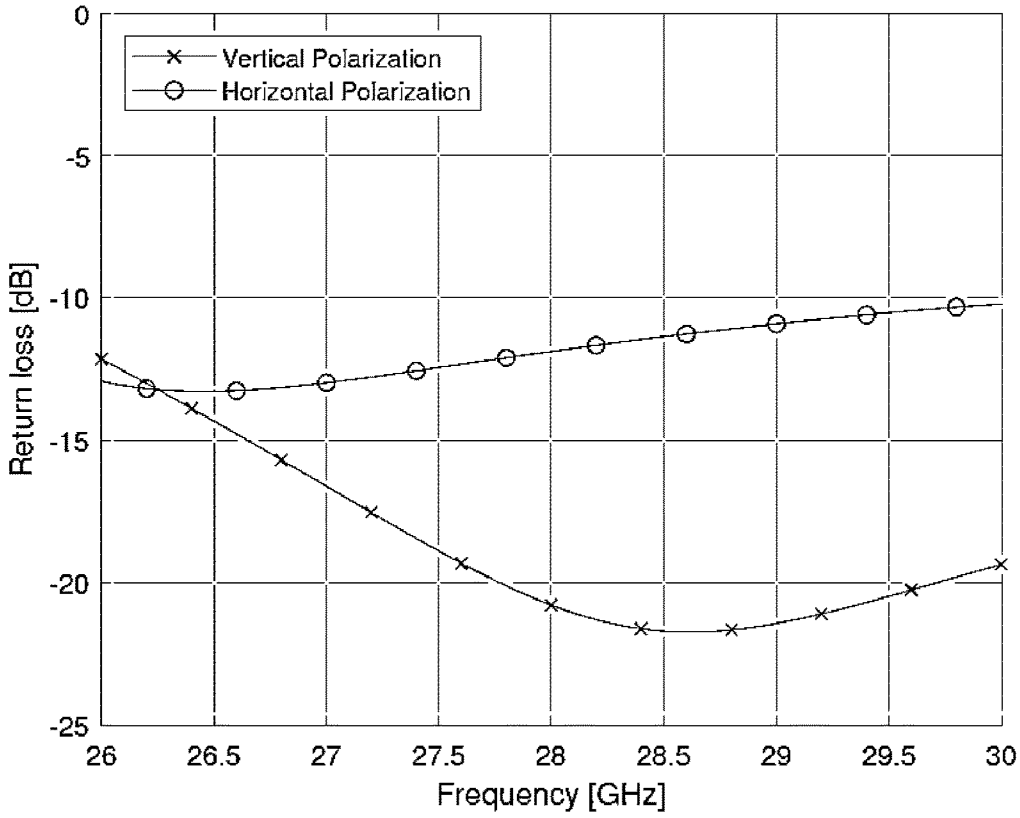
FIG. 13 shows the return loss of a feeding transition for vertical and horizontal polarization.

FIG. 13 shows the mode matching structure separately, where periodic boundaries have been used at the end of the total structure in the y-direction. This can be done to simulate the performance in an infinite array, which validates the use of multiple coupling slots. Due to the tight spacing also in the y-direction, it can be seen that the matching pins have a double role. The matching pins MP1 for VPol act as BON pins for HPol and similarly the matching pins MP2 for HPol act as BON pins for VPol.

Figure 14:
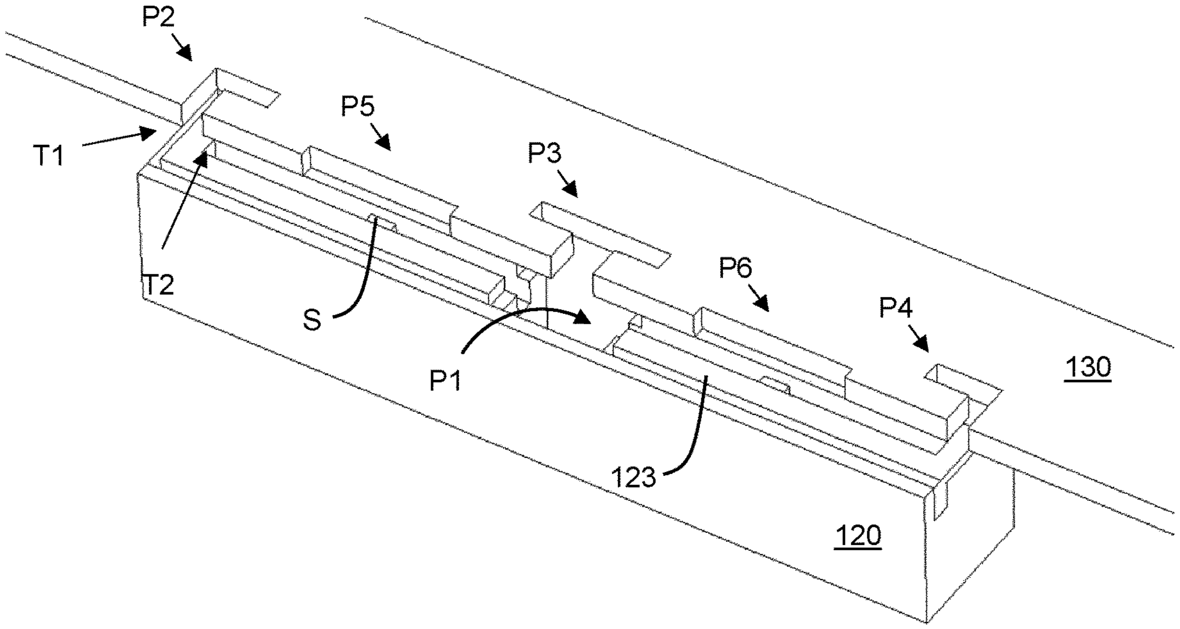
FIG. 14 shows a distribution layer where half of the slot layer has been removed, where waveguide ports P1 through P6, together with terminations T1-T2 and septum S are shown.
Figure 15:
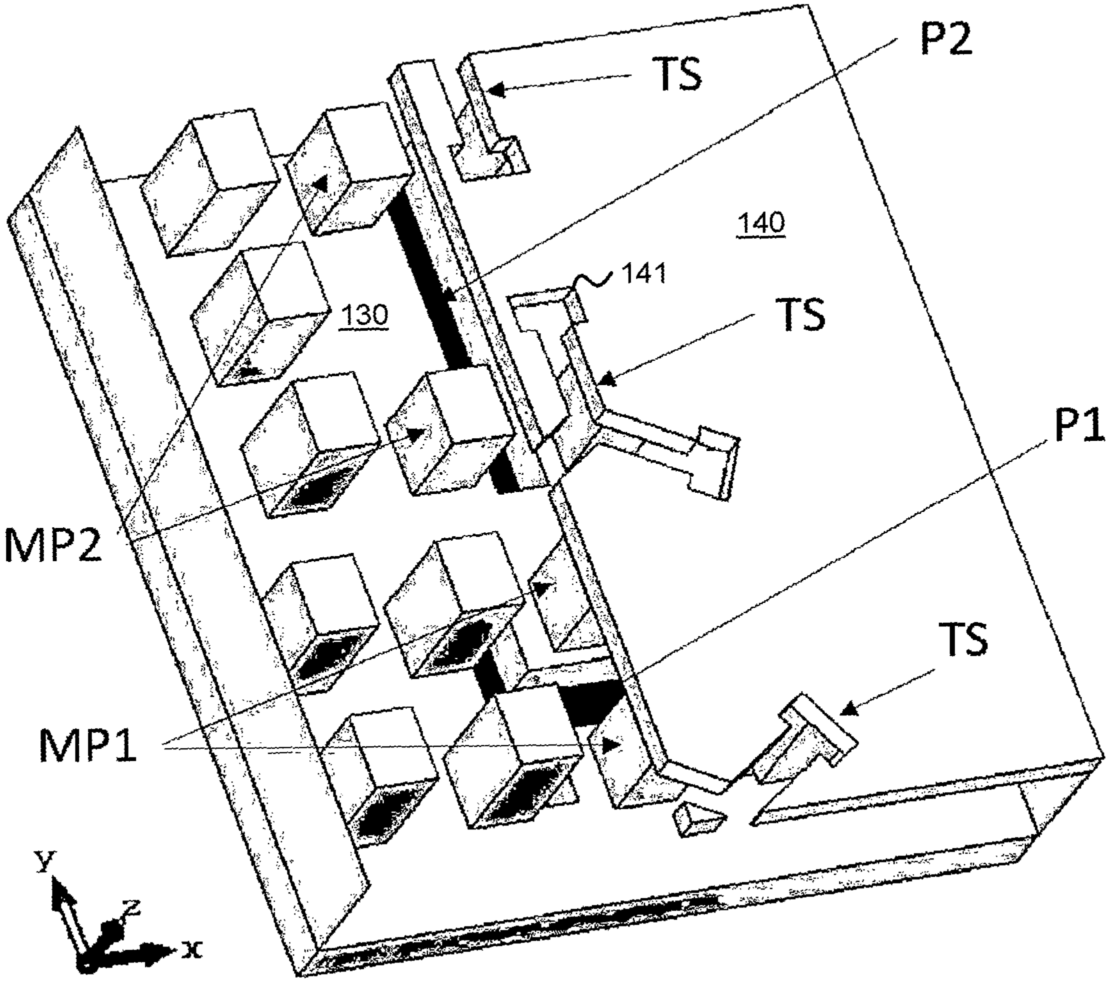
FIG. 15 shows a mode matching structure, with part of the aperture layer removed, where waveguide ports P1 and P2, together with the matching pins MP1 and MP2 as well as the tripole-like slots TS are shown.
Figure 16:
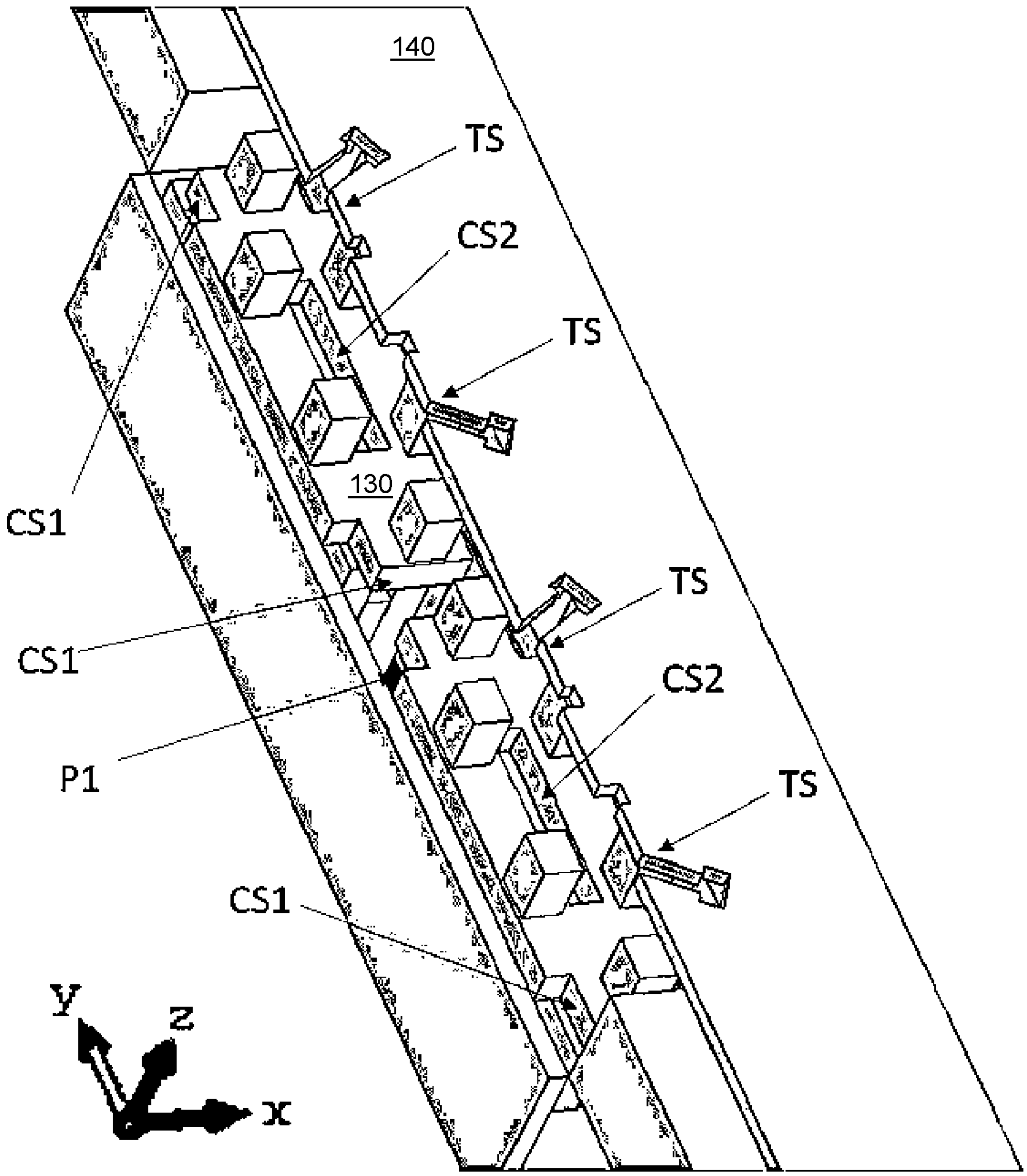
FIG. 16 shows a full antenna element where half of the aperture layer has been removed and a cut is made in the slot layer with a bed of nails (BoN) to show the underlying waveguide, where feeding port P1, coupling slots CS1 and CS2, together with the tripole-like slots TS are shown as well.

With the design of the distribution layer and mode matching layer complete, both can be combined to create the full example antenna element as shown in FIG. 14. More specifically, FIG. 14 shows a full antenna element where half of the aperture layer has been removed and a cut is made in the slot layer with a bed of nails (BoN) to show the underlying waveguide, where feeding port P1, coupling slots CS1 and CS2, together with the tripole-like slots TS are shown as well.

Figure 17:
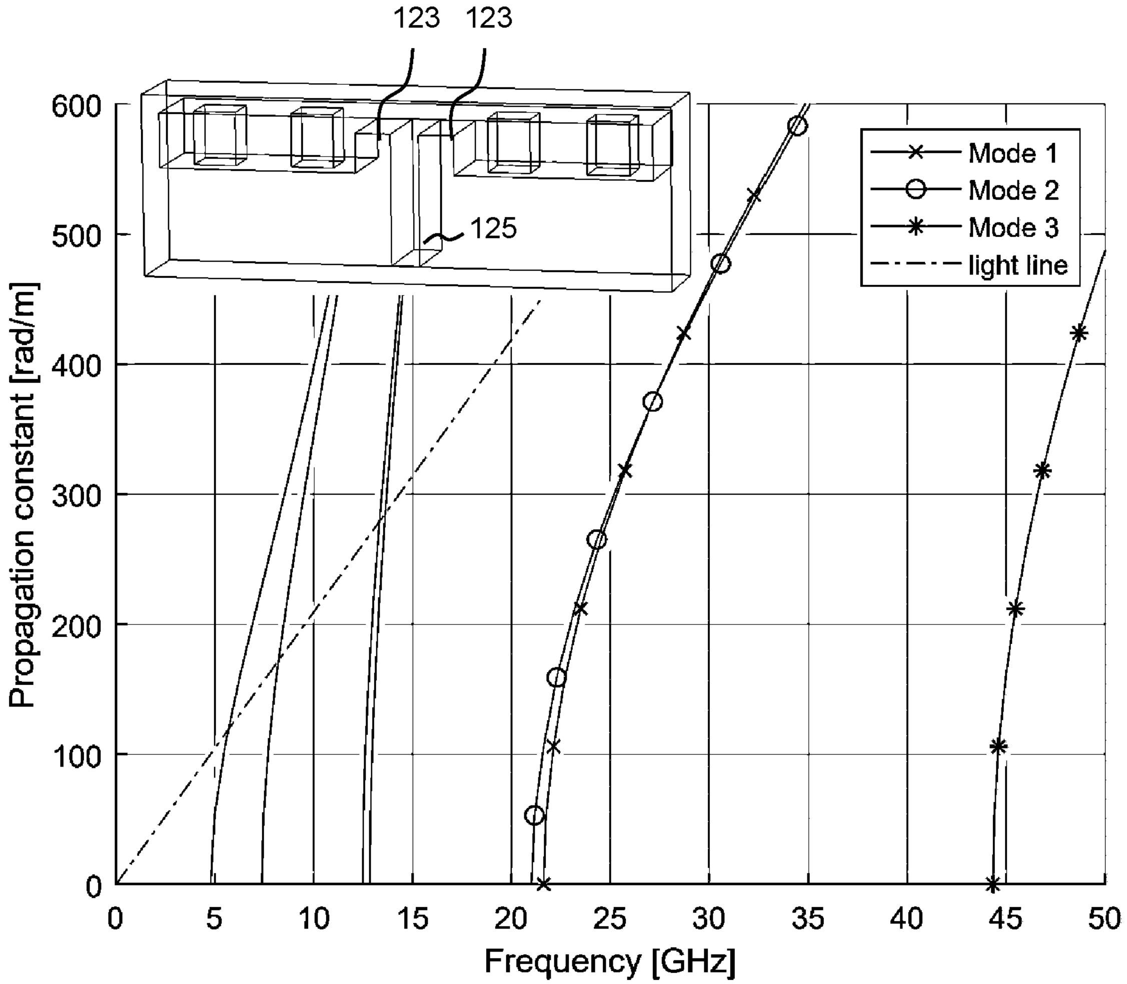
FIG. 17 shows a dispersion diagram of a dual mode ridge gap waveguide.

To simplify manufacturing, the DMHW in the example embodiment of FIGS. 9-16 may be converted to a DMRGW. FIG. 17 shows the dispersion diagram of the DMRGW. Similar to its hollow counterpart, the DMRGW supports only the necessary two modes within the frequency band with the next propagating mode with a cut-off frequency above the band. Besides the three propagating modes in FIG. 17 (where two are in the frequency band of operation), there are also four modes present below 20 GHz. These modes are a result of the band gap nature of the general gap waveguide technology. The fact that these modes cross the light line, indicates that these modes cannot physically propagate.

Figure 18:
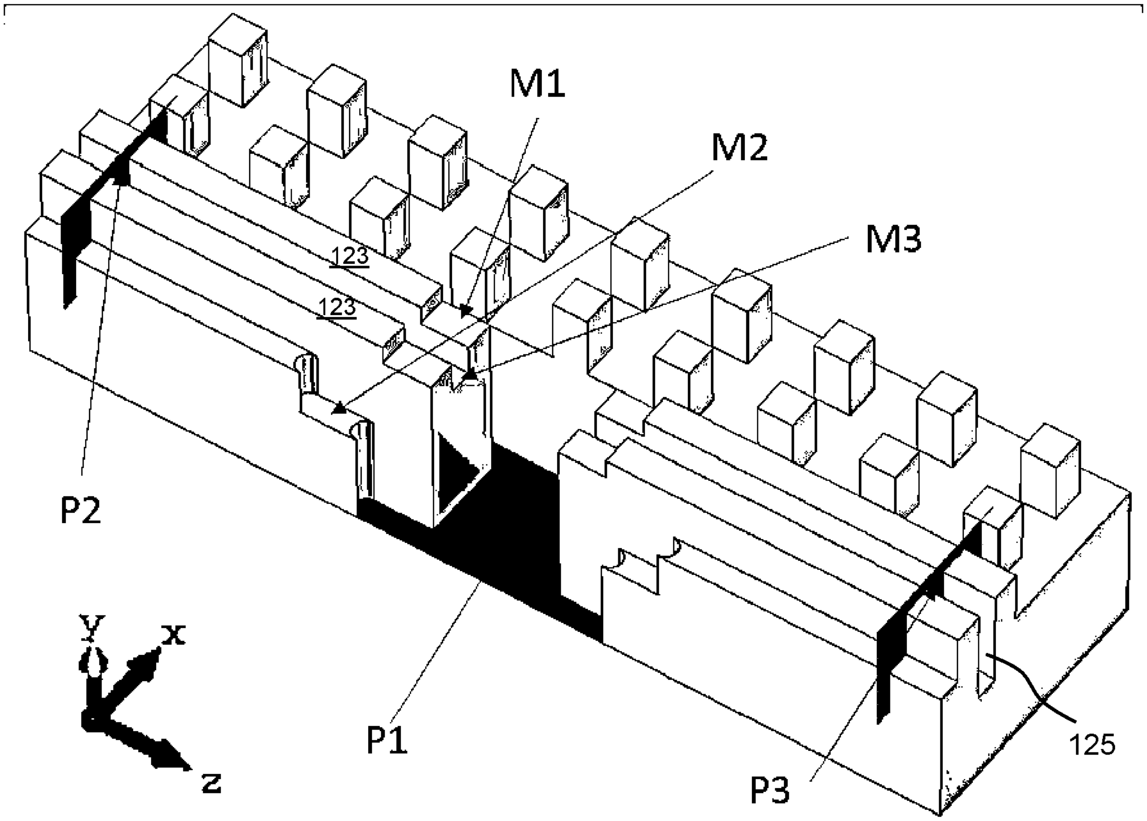
FIG. 18 shows a center feeding transition in gap waveguide technology where the top and one of the parts of the bed of nails structure has been removed, where waveguide ports P1, P2 and P3, together with matching structures M1, M2 and M3 are shown.
Figure 19:
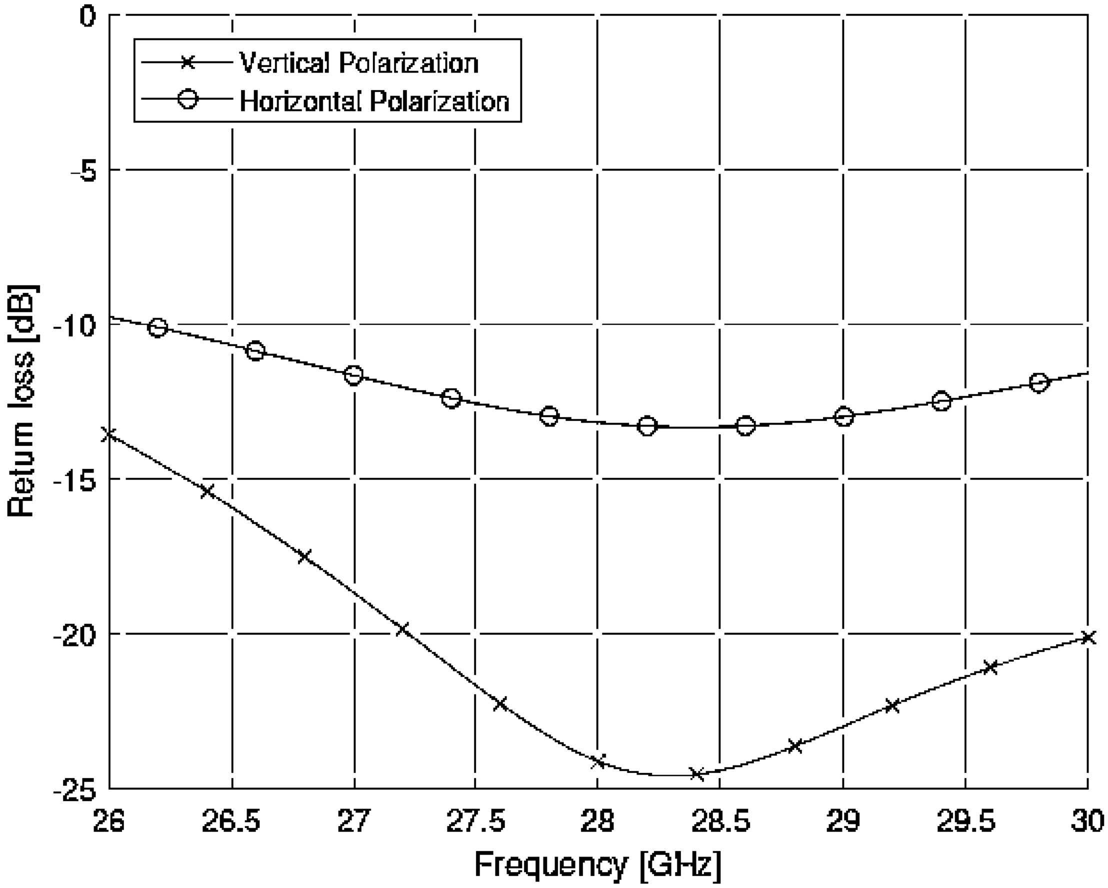
FIG. 19 shows the return loss of a feeding transition in gap waveguide technology vertical and horizontal polarization.

Similarly, the center feeding transition can be recreated in gap waveguide technology as shown in FIG. 18. This implementation has similar return loss to the hollow waveguide version, as is shown in FIG. 19, confirming the ability to convert from a hollow waveguide design to gap waveguide technology if proper care is chosen in the initial design. Finally, the termination for VPol may be redesigned. A common practice to short an RGW is to place a BoN pin at the end of the RGW. In other words, the conductive wall T1 may comprise an EBG structure.

The antenna arrangement 100 may comprise a transition from PCB to the distribution layer feed. This can be similar to a transition from microstrip to rectangular waveguide, see Y. Mizuno, et. al, "Loss reduction of microstrip-to-waveguide transition suppressing leakage from gap between substrate and waveguide by choke structure", In: 2016 International Symposium on Antennas and Propagation (ISAP), 2016, pp. 374-375, as well as a microstrip to double ridged waveguide, see A. Bagheri, et. al., "Microstrip to Ridge Gap Waveguide Transition for 28 GHZ Steerable Slot Array Antennas", In: 2020 14$^{th}$ European Conference on Antennas and Propagation (EuCAP), 2020, pp. 1-4. A transition from microstrip to a dual mode distribution layer feed can be made based on these know transitions, using a rectangular patch to support two orthogonal modes.

There is also disclosed herein an array antenna comprising a plurality of the antenna arrangement 100. Furthermore, there is also disclosed herein a telecommunication or radar transceiver comprising the antenna arrangement. In addition, Furthermore, there is also disclosed herein a vehicle comprising the antenna arrangement 100.

Figure 22:
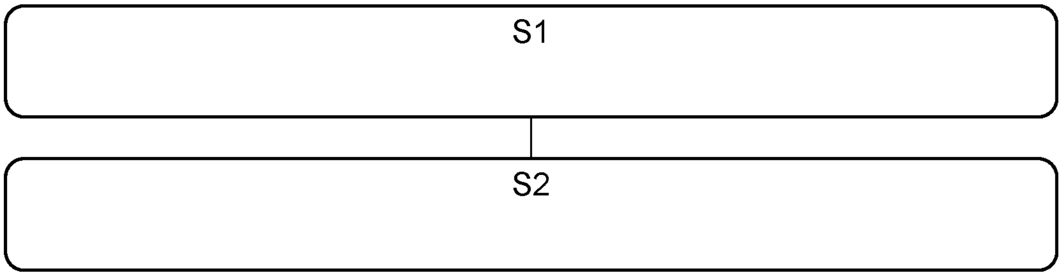
FIGS. 22-24 are flow charts illustrating methods.

As is shown in FIG. 22, there is also disclosed herein a method for manufacturing an antenna arrangement 100 having a layered configuration. The method comprises: providing S1 a slot layer 130 comprising one or more slot layer apertures 131, and arranging S2 a distribution layer 120 to facing the slot layer. The distribution layer is arranged to distribute two radio frequency (RF) signals to the one or more slot layer apertures 131. The distribution layer comprises a distribution layer feed 121 and at least one first waveguide 122 arranged to guide the RF signals between the distribution layer feed and the one or more slot layer apertures 131. The first waveguide 122 is a dual mode ridge waveguide comprising two parallel ridges 123 arranged on the distribution layer and along the first waveguide, where the two ridges are arranged in proximity to each other to support two modes.

The DMRW of the disclosed antenna arrangement 100 may be useful as a standalone waveguide, in other antenna arrangements, and any other microwave device. Therefore, there is also disclosed herein a dual mode ridge waveguide 122 for guiding a radio frequency (RF) signal, where the dual mode ridge waveguide comprising two parallel ridges 123 arranged on one waveguide wall and along the waveguide, where the two ridges are arranged in proximity to each other to support two modes. The two ridges 123 in the disclosed dual mode ridge waveguide 122 may be separated from each other by less than half a free space wavelength, preferably less than a quarter of such wavelength, and more preferably less than a tenth of such wavelength. Furthermore, a recess 125 may be arranged in between the two ridges 123 in the disclosed dual mode ridge waveguide 122, where a distance from the bottom of the recess to the top of the two ridges is a quarter of a free space wavelength. In addition, the disclosed dual mode ridge waveguide 122 may be a dual mode ridge gap waveguide.

Figure 23:
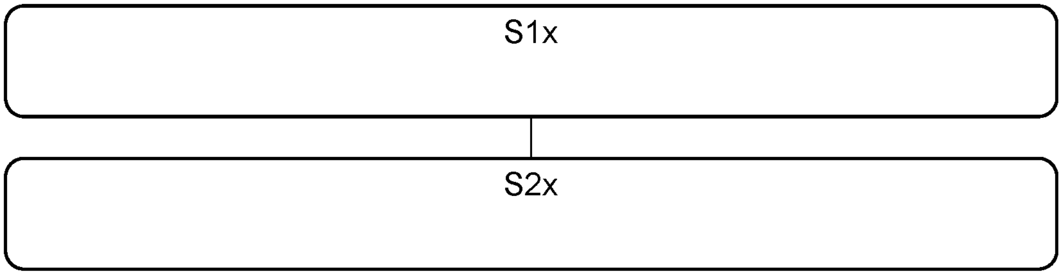

As is shown in FIG. 23, there is also disclosed herein a method for manufacturing a dual mode ridge waveguide 122 for guiding two radio frequency (RF) signals. The method comprising: providing S1*x* a waveguide, and arranging S2*x* two parallel ridges 123 on one waveguide wall of the waveguide and along the waveguide, where the two ridges are arranged in proximity to each other to support two modes.

The mode matching structure and relating transition of the disclosed antenna arrangement 100 may be useful as a standalone transition, in other antenna arrangements, and any other microwave device. Therefore, there is disclosed herein a transition arrangement for transitioning from single mode apertures to dual mode apertures. The transition arrangement comprises a slot layer 130 comprising a plurality of slot layer apertures 131 being respective slots, where the slots are arranged in a column and with a spacing of half a guide (or free space) wavelength, and arranged so that every other slot is orthogonal to the remainder of slots. The transition arrangement also comprising an aperture layer 140 facing the slot layer 130. The aperture layer comprises a plurality of aperture layer apertures 141, where the aperture layer apertures being dual mode apertures. Each slot layer aperture 131 is arranged to couple to two aperture layer apertures 141 via a mode matching structure 132. The aperture layer apertures are arranged with a spacing of half a guide wavelength. The mode matching structure 132 comprises a plurality of matching pins 133, where at least one pair of matching pins 133 is arranged along the direction of the column, and at least one a pair of matching pins 133 are arranged perpendicular to the direction of the column. The mode matching structure 132, slot layer apertures 131, and aperture layer apertures 141 are at least partly surrounded by an electromagnetic bandgap, EBG, structure 134.

At least one dual mode aperture layer aperture 141 may comprise three elongated arm sections. In that case, the elongated arm sections are symmetrically arranged with respect to a center of the aperture.

The transition arrangement may comprise a plurality of dual mode aperture layer apertures 131, where each dual mode aperture layer aperture comprises three elongated arm sections symmetrically arranged with respect to a center of the aperture, and wherein at least two of the dual mode aperture layer apertures are arranged mirrored with respect to each other in a direction along the aperture layer 140.

The EBG structure 134 may comprise a repetitive structure of protruding pins 135. In addition, at least one protruding pin 135 may also be acting as a matching pin.

Figure 24:
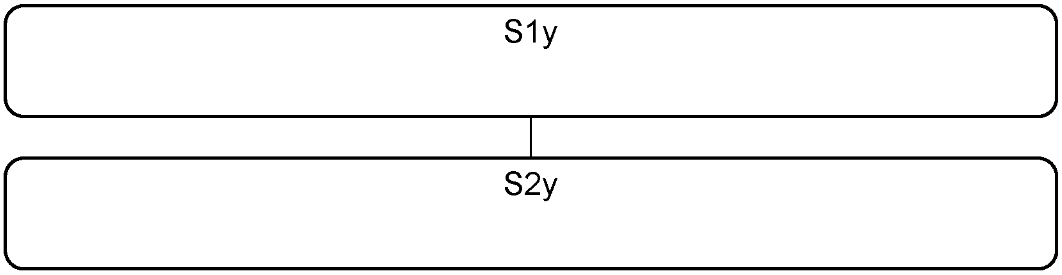

As is shown in FIG. 24, there is also disclosed herein a method for manufacturing a transition arrangement for transitioning from single mode apertures to dual mode aperture. The method comprises providing S1*y* a slot layer 130 comprising a plurality of slot layer apertures 121 being respective single mode apertures, where the slot layer apertures are arranged with a spacing of half a guide wavelength, and arranging S2*y* an aperture layer 140 to face the slot layer. The aperture layer comprises a plurality of aperture layer apertures 141, where the aperture layer apertures being dual mode apertures. Each slot layer aperture 131 is arranged to couple to two aperture layer apertures 141 via a mode matching structure 132. The aperture layer apertures are arranged with a spacing of half a guide wavelength.

The invention claimed is:

1. An antenna arrangement having a layered configuration comprising:

a slot layer comprising one or more slot layer apertures, and a distribution layer facing the slot layer, wherein the distribution layer is arranged to distribute two radio frequency, RF, signals to the one or more slot layer apertures, the distribution layer comprising a distribution layer feed and at least one first waveguide arranged to guide the RF signals between the distribution layer feed and the one or more slot layer apertures, wherein the first waveguide is a dual mode ridge waveguide comprising two parallel ridges arranged on the distribution layer and along the first waveguide, wherein the two ridges are arranged in proximity to each other to support two modes, and wherein the distribution layer includes a recess in between the two ridges, where a distance from a bottom of the recess to a top of the two ridges is within 25% of a quarter of a free space wavelength.

2. The antenna arrangement according to claim 1, wherein at least one slot layer aperture is a dual mode aperture.

3. The antenna arrangement according to claim 2, comprising a plurality of dual mode apertures, wherein each dual mode comprises three elongated arm sections symmetrically arranged with respect to a center of the aperture, and wherein at least two of the dual mode apertures are arranged mirrored with respect to each other along the first waveguide.

4. The antenna arrangement according to claim 1, comprising at least two slot layer apertures separated from each other by half a guide wavelength.

5. The antenna arrangement according to claim 1, comprising at least two slot layer apertures being respective slots, wherein the two slots are arranged to couple to respective modes of the dual mode ridge waveguide, and wherein one of the two respective slots is arranged extending along the first waveguide and the other slot is arranged extending orthogonal with respect to the first waveguide.

6. The antenna arrangement according to claim 1, comprising a second waveguide arranged extending in the same direction as the first waveguide, wherein the distribution layer feed is arranged between the first and the second waveguides, and wherein the second waveguide is a dual mode ridge waveguide comprising two parallel ridges arranged on the distribution layer and along the second waveguide, wherein the two ridges are arranged in proximity to each other to support two modes.

7. The antenna arrangement according to claim 1, wherein the distribution layer feed comprises a differential feed.

8. The antenna arrangement according to claim 7, wherein the two ridges are fed by respective ridge waveguides.

9. The antenna arrangement according to claim 1, wherein one end of the first waveguide is connected to the distribution layer feed and the other end comprises a dual mode termination.

10. The antenna arrangement according to claim 9, wherein the dual mode termination comprises a first conductive wall arranged between the ridges and a second conductive wall arranged to short the first waveguide, wherein the second wall is arranged at a distance from the first conductive wall.

11. The antenna arrangement according to claim 1, further comprising an aperture layer, the aperture layer comprising one or more aperture layer apertures, wherein the one or more slot layer apertures are arranged to couple to the one or more aperture layer apertures via a mode matching structure.

12. The antenna arrangement according to claim 11, wherein the mode matching structure comprises at least one matching pin.

13. The antenna arrangement according to claim 11, comprising at least two aperture layer apertures separated from each other by a half guide wavelength.

14. The antenna arrangement according to claim 11, wherein the mode matching structure, slot layer apertures, and aperture layer apertures are at least partly surrounded by an electromagnetic bandgap, EBG, structure.

15. The antenna arrangement according to claim 14, wherein the EBG structure comprises a repetitive structure of protruding pins, and wherein at least one protruding pin is also acting as a matching pin.

16. The antenna arrangement according to claim 11, comprising a plurality of slot layer apertures having respective slots, wherein every other slot is arranged to couple to one of the modes of the dual mode ridge waveguide and the remainder of slots are arranged to couple to the other of the modes of the dual mode ridge waveguide, where the slots are arranged with a spacing of half a guide wavelength, and wherein each slot is arranged to couple to two aperture layer apertures, wherein the aperture layer apertures are arranged with a spacing of half a guide wavelength.

17. An array antenna comprising a plurality of the antenna arrangement according to claim 1.

18. A dual mode ridge waveguide for guiding a radio frequency, RF, signal, where the dual mode ridge waveguide comprising two parallel ridges arranged on one waveguide wall and along the waveguide, wherein the two ridges are arranged in proximity to each other to support two modes, wherein a recess is arranged in between the two ridges, where a distance from the bottom of the recess to the top of the two ridges is within 25% of a quarter of a free space wavelength.

* * * * *